United States Patent
Watanabe et al.

(10) Patent No.: US 12,359,039 B2
(45) Date of Patent: Jul. 15, 2025

(54) METAL OXIDE PARTICLE-CONTAINING COMPOSITION WITH REDUCED OCCURRENCE OF VOLATILE ALDEHYDES

(71) Applicant: NISSAN CHEMICAL CORPORATION, Tokyo (JP)

(72) Inventors: Yuuki Watanabe, Funabashi (JP); Masato Yamaguchi, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 18/291,798

(22) PCT Filed: Oct. 14, 2022

(86) PCT No.: PCT/JP2022/038450
§ 371 (c)(1),
(2) Date: Jan. 24, 2024

(87) PCT Pub. No.: WO2023/068207
PCT Pub. Date: Apr. 27, 2023

(65) Prior Publication Data
US 2024/0417533 A1 Dec. 19, 2024

(30) Foreign Application Priority Data

Oct. 18, 2021 (JP) .................. 2021-170563
Dec. 16, 2021 (JP) .................. 2021-204477

(51) Int. Cl.
| | | |
|---|---|---|
| C09D 7/62 | (2018.01) | |
| C08K 3/22 | (2006.01) | |
| C08K 3/36 | (2006.01) | |
| C08K 9/02 | (2006.01) | |

(52) U.S. Cl.
CPC .................. *C08K 3/22* (2013.01); *C08K 3/36* (2013.01); *C08K 9/02* (2013.01); *C09D 7/62* (2018.01); *C08K 2003/2231* (2013.01); *C08K 2201/014* (2013.01)

(58) Field of Classification Search
CPC .............. C09D 7/62; C08K 3/22; C08K 3/36; C08K 9/02; C08K 2003/2231; C08K 2201/014
USPC ......................................................... 524/401
See application file for complete search history.

(56) References Cited

FOREIGN PATENT DOCUMENTS

| | | | |
|---|---|---|---|
| JP | 2000313829 A | * | 11/2000 |
| JP | 2008-173632 A | | 7/2008 |
| JP | 2010-159464 A | | 7/2010 |
| JP | 2011-74328 A | | 4/2011 |
| JP | 2012-168377 A | | 9/2012 |
| KR | 20140046796 A | * | 4/2014 |
| KR | 10-2020-0096934 A | | 8/2020 |
| WO | WO-2008003632 A1 * | 1/2008 | .............. A61K 8/27 |
| WO | 2011/090084 A1 | | 7/2011 |
| WO | 2021/182378 A1 | | 9/2021 |
| WO | 2021/193262 A1 | | 9/2021 |
| WO | 2021/200135 A1 | | 10/2021 |

OTHER PUBLICATIONS

Oct. 25, 2024 Office Action issued in Korean Patent Application No. 10-2024-7004833.
Jul. 20, 2024 Office Action issued in Chinese Patent Application No. 202280054717.7.
Apr. 23, 2024 Office Action issued in Korean Patent Application No. 10-2024-7004833.
Jan. 10, 2023 International Search Report issued in International Patent Application No. PCT/JP2022/038450.
Jan. 10, 2023 Written Opinion issued in International Patent Application No. PCT/JP2022/038450.
Apr. 26, 2023 Office Action issued in Japanese Patent Application No. 2023-509422.
Dec. 21, 2024 Office Action issued in Chinese Patent Application No. 202280054717.7.

* cited by examiner

*Primary Examiner* — Kelechi C Egwim
(74) *Attorney, Agent, or Firm* — Oliff PLC

(57) ABSTRACT

A composition containing photoactive metal oxide particles and capable of reducing generation of an aldehyde compound, etc. caused by photocatalytic action, and a production method for the composition. The composition including photoactive metal oxide particles (A), a dispersant (B), and an organic solvent (C) other than a volatile aldehyde compound, wherein the composition contains a $C_{1-2}$ alcohol in an amount of 200 ppm or less. The composition, wherein the metal oxide particles (A) contain at least one photoactive metal oxide selected from the group consisting of titanium oxide, tin oxide, and zirconium oxide, and have an average particle diameter of 5 to 60 nm as determined by dynamic light scattering. The photoactive metal oxide particles (A) contain at least one photoactive metal oxide selected from the group consisting of titanium oxide, tin oxide, and zirconium oxide in an amount of 50% by mole or more in the entire metal oxides.

20 Claims, No Drawings

METAL OXIDE PARTICLE-CONTAINING COMPOSITION WITH REDUCED OCCURRENCE OF VOLATILE ALDEHYDES

TECHNICAL FIELD

The present invention relates to a composition containing metal oxide particles with reduced generation of a volatile aldehyde, and a production method for the composition.

BACKGROUND ART

A composition containing a solvent containing metal oxide particles is used in the field of resin or film coating, etc.

Many reports have been made on metal oxide particles as photoactive particles. Typical examples of photoactive particles include titanium oxide particles, tin oxide particles, and zirconium oxide particles.

There have been disclosed modified metal oxide colloidal particles composed of metal oxide colloidal particles (serving as a core) and composite oxide colloidal particles covering the outer surfaces of the metal oxide colloidal particles; specifically, modified metal oxide colloidal particles (C) composed of colloidal particles (A) (serving as a core) of an oxide of at least one metal selected from the group consisting of Ti, Fe, Zr, Sn, Ta, Nb, Y, Mo, W, Pb, In, Bi, and Sr and having a primary particle diameter of 5 to 60 nm, and silicon dioxide-stannic oxide composite oxide colloidal particles (B) having a primary particle diameter of 1 to 4 nm and covering the outer surfaces of the colloidal particles (A), wherein the mass ratio of silicon dioxide/stannic oxide is 0.1 to 5.0, and an amine compound is bonded in a ratio by mole of $M/(SnO_2+SiO_2)$ (wherein M is an amine compound) of 0.001 to 0.08, as well as a coating composition containing the modified metal oxide colloidal particles (C) (see Patent Document 1).

There has been disclosed a production method for nanoparticles, characterized in that the surfaces of metal or metal oxide nanoparticles are coated with a phosphate-based surfactant (see Patent Document 2).

There has been disclosed a titanium oxide dispersion containing titanium oxide particles coated with a phosphorus-containing oxoacid, a (meth)acrylic monomer, and a phosphorus or sulfur oxoacid (see Patent Document 3).

PRIOR ART DOCUMENTS

Patent Documents

Patent Document 1: WO 2011/090084
Patent Document 2: JP 2010-159464 A
Patent Document 3: JP 2011-074328 A

SUMMARY OF THE INVENTION

Problems to be Solved by the Invention

The present invention provides a composition containing photoactive metal oxide particles and capable of reducing generation of an aldehyde compound, etc. caused by photocatalytic action, and a production method for the composition.

Means for Solving the Problems

A first aspect of the present invention is a composition comprising photoactive metal oxide particles (A), a dispersant (B), and an organic solvent (C) other than a volatile aldehyde compound, wherein the composition contains a $C_{1-2}$ alcohol in an amount of 200 ppm or less.

A second aspect of the present invention is the composition according to the first aspect, wherein the photoactive metal oxide particles (A) contain at least one photoactive metal oxide selected from the group consisting of titanium oxide, tin oxide, and zirconium oxide, and have an average particle diameter of 5 to 500 nm as determined by dynamic light scattering.

A third aspect of the present invention is the composition according to the first or second aspect, wherein the photoactive metal oxide particles (A) contain at least one photoactive metal oxide selected from the group consisting of titanium oxide, tin oxide, and zirconium oxide in an amount of 50% by mole or more in the entire metal oxides. A fourth aspect of the present invention is the composition according to any one of the first to third aspects, wherein the photoactive metal oxide particles (A) are metal oxide particles consisting of a photoactive metal oxide, metal oxide particles containing a photoactive metal oxide, or core-shell metal oxide particles; the core-shell metal oxide particles are prepared by coating the surfaces of metal oxide particles serving as a core with a coating layer of metal oxide particles having a metal oxide component or metal oxide content different from the metal oxide component or metal oxide content of the core metal oxide; and the core metal oxide particles, the metal oxide particles of the coating layer, or both of these contain a photoactive metal oxide.

A fifth aspect of the present invention is the composition according to the fourth aspect, wherein the photoactive metal oxide particles (A) are core-shell metal oxide particles prepared by coating the surfaces of titanium oxide-containing metal oxide particles serving as a core with silica-containing metal oxide particles, and contain titanium oxide in an amount of 50% by mole or more in the entire metal oxides.

A sixth aspect of the present invention is the composition according to the fourth aspect, wherein the core metal oxide particles are particles of titanium oxide, zirconium oxide, tin oxide, a titanium oxide-tin oxide composite oxide, a zirconium oxide-tin oxide composite oxide, a titanium oxide-zirconium oxide composite oxide, or a titanium oxide-zirconium oxide-tin oxide composite oxide.

A seventh aspect of the present invention is the composition according to the fourth aspect, wherein the metal oxide particles of the coating layer are particles of at least one metal oxide selected from the group consisting of silicon dioxide, tin oxide, antimony oxide, tungsten oxide, aluminum oxide, and zirconium oxide, or particles of a composite metal oxide.

An eighth aspect of the present invention is the composition according to any one of the first to seventh aspects, wherein the dispersant (B) is a silane compound, an organic acid or a salt thereof, a phosphate ester, or a surfactant.

A ninth aspect of the present invention is the composition according to the eighth aspect, wherein the silane compound is a silane coupling agent, and the silane coupling agent is at least one silane compound selected from the group consisting of silane compounds of the following Formulae (1) to (3):

Formula (1)

Formula (2)

Formula (3)

(in Formula (1), $R^1$ is each an alkyl group, a halogenated alkyl group, an alkenyl group, an aryl group, or an organic group containing a polyether group, an epoxy group, a (meth)acryloyl group, a mercapto group, an amino group, a ureido group, or a cyano group, and is bonded to a silicon atom via an Si—C bond; $R^2$ is each an alkoxy group, an acyloxy group, or a halogen group; and a is an integer of 1 to 3, and in Formulae (2) and (3), each of $R^3$ and $R^5$ is a $C_{1-3}$ alkyl group or a $C_{6-30}$ aryl group, and is bonded to a silicon atom via an Si—C bond; each of $R^4$ and $R^6$ is an alkoxy group, an acyloxy group, or a halogen group; Y is an alkylene group, an NH group, or an oxygen atom; b is an integer of 1 to 3; c is an integer of 0 or 1; and d is an integer of 1 to 3).

A tenth aspect of the present invention is the composition according to the eighth aspect, wherein the organic acid is at least one organic acid selected from the group consisting of a divalent aliphatic carboxylic acid, an aliphatic oxycarboxylic acid, an amino acid, and a chelating agent; the divalent aliphatic carboxylic acid is selected from the group consisting of oxalic acid, malonic acid, and succinic acid; the aliphatic oxycarboxylic acid is selected from the group consisting of glycolic acid, lactic acid, malic acid, tartaric acid, and citric acid; the amino acid is selected from the group consisting of glycine, alanine, valine, leucine, serine, and threonine; and the chelating agent is selected from the group consisting of ethylenediaminetetraacetic acid, L-aspartic acid-N,N-diacetic acid, and diethylenetriaminepentaacetic acid.

An eleventh aspect of the present invention is the composition according to the eighth aspect, wherein the phosphate ester is at least one phosphate ester selected from the group consisting of phosphate esters of the following Formulae (4) to (6):

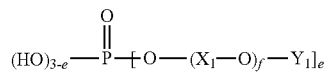

Formula (4)

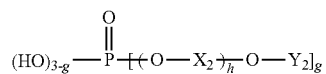

Formula (5)

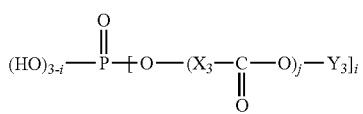

Formula (6)

(in Formulae (4) to (6), $X_1$, $X_2$, and $X_3$ are each a $C_{2-20}$ alkylene group; f, h, and j are each an integer of 1 to 100; e, g, and i are each an integer of 1 to 3; and $Y_1$, $Y_2$, and $Y_3$ are each a hydrogen atom, a $C_{1-20}$ alkyl group, a $C_{2-20}$ alkenyl group, or a (meth)acrylic group).

A twelfth aspect of the present invention is the composition according to the eighth aspect, wherein the phosphate ester is a polyoxyethylene alkyl (C6-10) ether phosphate ester having a $C_{6-10}$ alkyl group.

A thirteenth aspect of the present invention is the composition according to the eighth aspect, wherein the surfactant is an anionic surfactant, a cationic surfactant, a nonionic surfactant, or an amphoteric surfactant.

A fourteenth aspect of the present invention is the composition according to any one of the first to thirteenth aspects, wherein the organic solvent (C) is a $C_{3-10}$ alcohol possibly having an ether bond, an ester, a ketone, an amide, or a hydrocarbon.

A fifteenth aspect of the present invention is the composition according to any one of the first to fourteenth aspects, wherein the composition further comprises a secondary amine or tertiary amine having a total carbon atom number of 5 to 35.

A sixteenth aspect of the present invention is the composition according to any one of the first to fifteenth aspects, wherein, when 15 g of the composition is irradiated with ultraviolet rays having a wavelength of 365 nm at an intensity of 0.4 mW/cm² for four hours, the amount of a volatile aldehyde compound generated in the composition is 2 ppm or less.

A seventeenth aspect of the present invention is the composition according to any one of the first to sixteenth aspects, wherein the composition contains a solid content in an amount of 0.1 to 70% by mass, and the entire solid content contains the photoactive metal oxide particles (A) in an amount of 80 to 99% by mass and the dispersant (B) in an amount of 1 to 20% by mass.

An eighteenth aspect of the present invention is a varnish comprising the composition according to any one of the first to seventeenth aspects, and a thermosetting or photocurable resin.

A nineteenth aspect of the present invention is the varnish according to the eighteenth aspect, wherein the varnish is a hard coating agent or a filler.

A twentieth aspect of the present invention is a method for producing the composition according to any one of the first to seventeenth aspects, the method comprising the following steps (i) and (ii):

step (i): a step of mixing photoactive metal oxide particles (A), a dispersant (B), and an organic solvent (C) other than a volatile aldehyde compound; and step (ii): a step of removing a $C_{1-2}$ alcohol from the liquid of mixture prepared in the step (i) so that the amount of the $C_{1-2}$ alcohol is 200 ppm or less in the entire solvent.

Effects of the Invention

Photoactive metal oxide particles (e.g., metal oxide particles containing titanium oxide, tin oxide, and zirconium oxide) have an effect of reducing themselves and oxidizing others, since titanium oxide, tin oxide, and zirconium oxide have a photocatalytic effect. In a composition containing photoactive metal oxide particles, the photoactive metal oxide particles are dispersed in a solvent. The solvent used is generally a $C_{1-2}$ lower alcohol such as methanol or ethanol. Such an alcohol is oxidized by the photocatalytic action of the photoactive metal oxide particles; specifically, methanol is oxidized into formaldehyde, and ethanol is oxidized into acetaldehyde. Formaldehyde and acetaldehyde, which are each a volatile aldehyde compound, are known to adversely affect the human body, and thus the generation of such an aldehyde compound is required to be reduced as much as possible.

A composition containing photoactive metal oxide particles may contain a dispersant or any additive. In some cases, a lower alcohol may be used as a raw material or a reaction solvent during production of such a dispersant or additive, and may be mixed into the final product of the dispersant or the additive.

In the production of a composition containing photoactive metal oxide particles, methanol or ethanol may be mixed into the composition as a by-product (e.g., a hydrolysis residue of a silane coupling agent) through a reaction during production of the product, or the composition may be contaminated with methanol or ethanol when such methanol or ethanol is used as a washing solvent in vessels or pipes of a production apparatus and remains therein. Since the composition contains methanol or ethanol, formaldehyde or acetaldehyde is generated by the photocatalytic action of the photoactive metal oxide particles.

The composition of the present invention contains an organic solvent other than a volatile aldehyde compound, and the composition contains a $C_{1-2}$ alcohol in an amount of 200 ppm or less. Thus, it was found that the amount of a volatile aldehyde generated through irradiation of the composition with visible light or ultraviolet rays is reduced to 2 ppm or less. Since the composition contains a specific amount of a specific dispersant (e.g., a silane coupling agent, an organic acid or a salt thereof, a phosphate ester, or a surfactant), the photoactive metal oxide particles are highly dispersed in the organic solvent contained in the composition.

MODES FOR CARRYING OUT THE INVENTION

The present invention is directed to a composition containing photoactive metal oxide particles (A), a dispersant (B), and an organic solvent (C) other than a volatile aldehyde compound, wherein the composition contains a $C_{1-2}$ alcohol in an amount of 200 ppm or less. The amount of the $C_{1-2}$ alcohol contained in the composition is preferably, for example, 0.001 to 200 ppm or 0.01 to 100 ppm.

The aforementioned photoactive metal oxide particles (A) contain at least one photoactive metal oxide selected from the group consisting of titanium oxide, tin oxide, and zirconium oxide. The metal oxide particles may have an average particle diameter of 5 to 500 nm, 5 to 300 nm, 5 to 250 nm, or 5 to 60 nm as determined by dynamic light scattering.

The photoactive metal oxide particles (A) are reduced per se by photocatalytic action, and oxidize others. Thus, the metal oxide particles oxidize the solvent contained in the composition (e.g., a $C_{1-2}$ alcohol; i.e., methanol or ethanol) to thereby generate a volatile aldehyde (e.g., formaldehyde or acetaldehyde). The metal oxide particles may contain a photoactive metal oxide in an amount of 50% by mole or more or 50 to 100% by mole in the entire metal oxides. Specifically, the photoactive metal oxide particles (A) may contain at least one photoactive metal oxide selected from the group consisting of titanium oxide, tin oxide, and zirconium oxide in an amount of 50% by mole or more in the entire metal oxides.

The photoactive metal oxide particles (A) may be metal oxide particles consisting of a photoactive metal oxide, metal oxide particles containing a photoactive metal oxide, or core-shell metal oxide particles.

The core-shell metal oxide particles are prepared by coating the surfaces of metal oxide particles serving as a core with a coating layer of metal oxide particles having a metal oxide component or metal oxide content different from the metal oxide component or metal oxide content of the core metal oxide. The core metal oxide particles, the metal oxide particles of the coating layer, or both of these may contain a photoactive metal oxide.

In the present specification, the photoactive metal oxide contained in the photoactive metal oxide particles (A) may be in the form of particles or aggregates thereof (photoactive metal oxide particles (i)). Thus, the photoactive metal oxide particles (A) may be metal oxide particles consisting of the photoactive metal oxide particles (i) or metal oxide particles containing the photoactive metal oxide particles (i). When the photoactive metal oxide particles (A) are core-shell metal oxide particles, the core metal oxide particles, the metal oxide particles of the coating layer, or both of these may be particles containing the photoactive metal oxide particles (i).

The expression "metal oxide particles consisting of a photoactive metal oxide" refers to the case where the photoactive metal oxide particles (A) are formed only of (i.e., contain 100% by mole) a photoactive metal oxide (or photoactive metal oxide particles (i)).

The expression "metal oxide particles containing photoactive metal oxide particles" refers to the case where the photoactive metal oxide particles (A) contain a photoactive metal oxide (or photoactive metal oxide particles (i)) in an amount of 50% by mole or more and less than 100% by mole in the entire metal oxides.

The expression "core-shell metal oxide particles prepared by coating the surfaces of metal oxide particles serving as a core with a coating layer of metal oxide particles having a metal oxide component or metal oxide content different from the metal oxide component or metal oxide content of the core metal oxide" refers to the case where the core metal oxide particles, the metal oxide particles of the coating layer, or both of these contain a photoactive metal oxide (or photoactive metal oxide particles (i)) in an amount of 50% by mole or more and 100% by mole or less in the entire metal oxides. For example, the photoactive metal oxide particles (A) may be core-shell metal oxide particles prepared by coating the surfaces of titanium oxide-containing metal oxide particles serving as a core with silica-containing metal oxide particles, wherein the photoactive metal oxide particles (A) contain titanium oxide in an amount of 50% by mole or more in the entire metal oxides.

The metal oxide particles serving as a core may be, for example, particles containing titanium oxide, zirconium oxide, tin oxide, a titanium oxide-tin oxide composite oxide, a zirconium oxide-tin oxide composite oxide, a titanium oxide-zirconium oxide composite oxide, or a titanium oxide-zirconium oxide-tin oxide composite oxide. The particles have an average primary particle diameter of 5 to 500 nm, 5 to 300 nm, 5 to 250 nm, or 5 to 60 nm as determined by observation with a transmission electron microscope.

The metal oxide particles contained in the coating layer may be, for example, particles of at least one metal oxide selected from the group consisting of silicon dioxide, tin oxide, antimony oxide, tungsten oxide, aluminum oxide, and zirconium oxide, or particles of a composite metal oxide. The particles have an average primary particle diameter of 1 to 10 nm or 1 to 5 nm as determined by observation with a transmission electron microscope. The metal oxide particles contained in the coating layer may be, for example, metal oxide particles containing one of silicon dioxide, tin oxide, antimony oxide, tungsten oxide, aluminum oxide, and zirconium oxide alone, or composite metal oxide particles containing a combination of a plurality of the aforementioned metal oxides. Examples of the composite metal oxide particles include tin oxide-silicon dioxide composite metal oxide particles, tin oxide-zirconium oxide-silicon dioxide composite metal oxide particles, tin oxide-tungsten oxide-silicon dioxide composite metal oxide particles, and antimony oxide-silicon dioxide composite metal oxide particles. When the metal oxide particles of the coating layer contain silica particles, the amounts of the silica particles and the other metal oxide particles may be determined so that the mass ratio of (silicon dioxide)/(other metal oxides) is 0.1 to 5.0.

In the case of the use of the core-shell structure, the expression "coating with a coating layer of metal oxide particles having a metal oxide component or metal oxide content different from the metal oxide component or metal oxide content of the core metal oxide" may include the case where the metal oxide components of the core differ from those of the coating layer, and the case where the metal oxide components of the core are partially in common with those of the coating layer, but the metal oxide proportions of the core differ from those of the coating layer.

In the case of the core-shell structure, the mass ratio of the metal oxide particles of the coating layer to the metal oxide particles of the core; i.e., (the metal oxide particles of the coating layer)/(the metal oxide particles of the core) may be determined to fall within a range of 0.05 to 0.50.

In the case where, for example, the metal oxide particles of the coating layer contain a tin oxide-silicon dioxide composite oxide, the alkali stannate used may be sodium stannate or potassium stannate and is preferably sodium stannate.

The alkali silicate used may be sodium silicate or potassium silicate.

The alkali stannate and alkali silicate used may be produced by preparation of an aqueous solution containing silicon dioxide and stannic oxide (mass ratio of silicon dioxide/stannic oxide:0.1 to 5), and subsequent removal of cations present in the aqueous solution with a cation exchange resin.

For preparation of the alkali stannate and the alkali silicate, silicon dioxide and stannic oxide are weighed so that the mass ratio of silicon dioxide/stannic oxide is 0.1 to 5.0, and they are dissolved in water. The solid content concentration of the aqueous solution is preferably 1 to 12% by mass in terms of ($SnO_2$+$SiO_2$).

Cations are removed from the thus-prepared aqueous solution with a cation exchange resin. The cation exchange resin is preferably a hydrogen-type strongly acidic cation exchange resin, and the cation exchange may be performed with a column charged with, for example, Amberlite (trade name) 120B. This cation exchange enables polymerization of silicic acid component and stannic acid component, to thereby produce silicon dioxide-stannic oxide composite colloidal particles having a primary particle diameter of 1 to 4 nm.

The silicon dioxide-stannic oxide composite colloidal particles have a poor stability and gelate within several hours when being allowed to stand. Thus, the colloidal particles must be stabilized by addition of an amine compound immediately after the cation exchange, to thereby prepare an aqueous sol of silicon dioxide-stannic oxide composite oxide colloidal particles having a primary particle diameter of 1 to 4 nm and stabilized with the amine compound, wherein the mass ratio of silicon dioxide/stannic oxide is 0.1 to 5.0, and the amine compound is present in a ratio by mole of M/($SnO_2$+$SiO_2$) (wherein M is the amine compound) of 0.1 to 1.0. The resultant aqueous sol has a solid content concentration of 0.1 to 10% by mass in terms of ($SnO_2$+$SiO_2$).

The silicon dioxide-stannic oxide composite colloidal particles produced through the aforementioned cation exchange are appropriately stabilized by addition of an amine compound in such an amount that the ratio by mole of M/($SnO_2$+$SiO_2$) (wherein M is the amine compound) is 0.1 to 1.0. When the amine compound is added in such an amount that the ratio by mole of M/($SnO_2$+$SiO_2$) is less than 0.1, the colloidal particles lose stability and gelate when being allowed to stand for several hours, which is not preferable.

Subsequently, an aqueous sol of metal oxide colloidal particles (a) having a primary particle diameter of 5 to 60 nm and serving as a core may be mixed with an aqueous sol of silicon dioxide-stannic oxide composite oxide colloidal particles (b) having a primary particle diameter of 1 to 4 nm and stabilized with the amine compound wherein the mass ratio of silicon dioxide/stannic oxide is 0.1 to 5.0, and the ratio by mole of M/($SnO_2$+$SiO_2$) (wherein M is the amine compound) is 0.1 to 1.0 so that the mass ratio of the silicon dioxide-stannic oxide composite oxide colloidal particles to the metal oxide colloidal particles (i.e., mass ratio of (b)/(a)) is 0.05 to 0.50, to thereby prepare an aqueous sol of modified metal oxide colloidal particles (A) wherein the metal oxide colloidal particles (a) are coated with the silicon dioxide-stannic oxide composite oxide colloidal particles (b).

The aqueous sol of the metal oxide colloidal particles (a) has a solid content concentration of 0.5 to 50% by mass, preferably 5 to 30% by mass.

The aqueous sol of the metal oxide colloidal particles (a) may have a pH of 5 to 11.5, preferably a pH of 7 to 11.5. If necessary, the pH of the aqueous sol may be adjusted with an alkaline component. Examples of the alkaline component used include a hydroxide of an alkali metal such as lithium, sodium, or potassium, a hydroxide of an alkaline earth metal such as calcium, magnesium, or strontium, ammonia, an alkylamine such as ethylamine, triethylamine, isopropylamine, or n-propylamine, an aralkylamine such as benzylamine, an alicyclic amine such as piperidine, an alkanolamine such as monoethanolamine or triethanolamine, and a quaternary ammonium hydroxide.

Preferably, the aqueous sol of the metal oxide colloidal particles (a) is mixed with the aqueous sol of the coating particles (b) with stirring.

The mixing ratio of the silicon dioxide-stannic oxide composite oxide colloidal particles (b) to the metal oxide colloidal particles (a); i.e., the mass ratio of (b)/(a) is preferably 0.05 to 0.50. When the mass ratio of (b)/(a) is less than 0.05, the metal oxide colloidal particles (a) serving as a core cannot be sufficiently coated with the silicon dioxide-stannic oxide composite oxide colloidal particles (b), resulting in failure to produce a stable hydrophilic organic solvent dispersion sol or a hydrophobic organic solvent dispersion sol having a water solubility of 0.05 to 12% by mass. A sufficient effect is achieved when the aforementioned mass ratio is 0.50, and a mass ratio exceeding 0.50 is not efficient.

Subsequently, the resultant aqueous sol of the modified metal oxide colloidal particles (A) is subjected to cation exchange. The cation exchange is preferably performed with a hydrogen-type strongly acidic cation exchange resin.

Subsequently, an amine compound is added to the resultant aqueous sol in such an amount that the ratio by mole of the amine compound to the silicon dioxide-stannic oxide composite oxide colloidal particles (b); i.e., the ratio by mole of M/($SnO_2$+$SiO_2$) (wherein M is the amine compound) is 0.001 to 0.08. When the amine compound is added in such an amount that the ratio by mole of M/($SnO_2$+$SiO_2$) is less than 0.001, the hydrophilic organic solvent dispersion sol of the present invention exhibits an insufficient dispersion stability, which is not preferable. Meanwhile, a ratio by mole of M/($SnO_2$+$SiO_2$) exceeding 0.08 may result in hindrance of binding of a silane compound to the surfaces of the modified metal oxide colloidal particles (A).

Subsequently, the aqueous medium of the resultant aqueous sol is replaced with a hydrophilic organic solvent. The replacement of the dispersion medium (water) with a hydrophilic organic solvent may be performed by any known method; for example, evaporation replacement, ultrafiltration membrane method, or solvent extraction at ambient pressure or under reduced pressure.

For efficient solvent replacement, preferably, the resultant aqueous sol is preliminarily concentrated so that the concentration of the modified metal oxide colloidal particles (A) contained in the sol falls within a range of 1 to 70% by mass or 10 to 50% by mass. The sol may be concentrated by any known method; for example, evaporation by heating, or ultrafiltration. During the solvent replacement, the temperature of the sol is controlled to fall within a range of room temperature to the boiling point of the hydrophilic solvent. The solvent replacement is performed until the water content of the sol reaches less than 5% by mass. The solid content concentration of the resultant sol is 20 to 70% by mass in terms of the total metal oxide concentration of the modified metal oxide colloidal particles (A).

In the present invention, the organic solvent for the solvent replacement is used as the organic solvent (C) according to the present invention. The organic solvent (C) is preferably an organic solvent (C) that contains a $C_{1-2}$ alcohol in an amount of 200 ppm or less in the entire solvent and is other than a volatile aldehyde compound. The organic solvent (C) is, for example, a $C_{3-10}$ alcohol possibly having an ether bond, an ester, a ketone, an amide, or a hydrocarbon.

Examples of the $C_{3-10}$ alcohol include n-propanol, i-propanol, n-butanol, isobutanol, n-pentanol, ethylene glycol, ethylene glycol monomethyl ether, propylene glycol monomethyl ether, propylene glycol monoethyl ether, and propylene glycol monopropyl ether.

Examples of the ketone include linear or cyclic aliphatic ketones having a carbon atom number of 3 to 30, such as methyl ethyl ketone, diethyl ketone, methyl propyl ketone, methyl isobutyl ketone, diisopropyl ketone, diisobutyl ketone, methyl amyl ketone, and cyclohexanone.

Examples of the ether include linear or cyclic aliphatic ethers having a carbon atom number of 3 to 30, such as diethyl ether and tetrahydrofuran.

Examples of the ester include linear or cyclic esters having a carbon atom number of 2 to 30, such as ethyl acetate, n-butyl acetate, sec-butyl acetate, methoxybutyl acetate, amyl acetate, n-propyl acetate, isopropyl acetate, ethyl lactate, butyl lactate, ethylene glycol monomethyl ether acetate, propylene glycol monomethyl ether acetate, propylene glycol monoethyl ether acetate, propylene glycol monopropyl ether acetate, phenyl acetate, phenyl lactate, and phenyl propionate. Examples of the amide include aliphatic amides having a carbon atom number of 3 to 30, such as dimethylacetamide, dimethylformamide, N-methylpyrrolidone, and N-ethylpyrrolidone.

Examples of the hydrocarbon include linear or cyclic aliphatic or aromatic hydrocarbons having a carbon atom number of 6 to 30, such as hexane, heptane, octane, nonane, decane, benzene, toluene, and xylene.

The composition of the present invention may further contain a secondary amine or tertiary amine having a total carbon atom number of 5 to 35.

For example, when the photoactive metal oxide particles (A) contain silica particles, the amount of the aforementioned amine contained in the composition may be determined to 0.01 to 10.0 mmol or 0.01 to 5.0 mmol relative to 100 g of $SiO_2$ of the silica particles.

Examples of the aforementioned secondary amine include ethyl-n-propylamine, ethylisopropylamine, dipropylamine, diisopropylamine, ethylbutylamine, n-propylbutylamine, dibutylamine, ethylpentylamine, n-propylpentylamine, isopropylpentylamine, dipentylamine, ethyloctylamine, i-propyloctylamine, butyloctylamine, and dioctylamine.

Examples of the aforementioned tertiary amine include triethylamine, ethyl-di-n-propylamine, diethyl-n-propylamine, tri-n-propylamine, triisopropylamine, ethyldibutylamine, diethylbutylamine, isopropyldibutylamine, diisopropylethylamine, diisopropylbutylamine, tributylamine, ethyldipentylamine, diethylpentylamine, tripentylamine, methyldioctylamine, dimethyloctylamine, ethyldioctylamine, diethyloctylamine, trioctylamine, benzyldibutylamine, and diazabicycloundecene.

Among the aforementioned amines, preferred are secondary amines and tertiary amines having an alkyl group having a total carbon atom number of 6 to 35, such as diisopropylamine, tripentylamine, triisopropylamine, dimethyloctylamine, and trioctylamine.

In the composition of the present invention, the dispersant (B) may be a silane compound, an organic acid or a salt thereof, a phosphate ester, or a surfactant.

The silane compound may be a silane coupling agent, and the silane coupling agent is, for example, at least one silane compound selected from the group consisting of silane compounds of Formulae (1) to (3). The present invention may involve the use of the photoactive metal oxide particles (A) coated with a hydrolysate of the aforementioned silane compound.

At least one silane compound selected from the group consisting of silane compounds of Formulae (1) to (3) may be added to the above-prepared hydrophilic organic solvent dispersion sol, and the silane compound may be hydrolyzed, to thereby coat the photoactive metal oxide particles (A) in the sol with the hydrolysate.

In Formula (1), $R^1$ is each an alkyl group, a halogenated alkyl group, an alkenyl group, an aryl group, or an organic group containing a polyether group, an epoxy group, a (meth)acryloyl group, a mercapto group, an amino group, a ureido group, or a cyano group, and is bonded to a silicon atom via an Si—C bond; $R^2$ is each an alkoxy group, an acyloxy group, or a halogen group; and a is an integer of 1 to 3.

In Formulae (2) and (3), each of $R^3$ and $R^5$ is a $C_{1-3}$ alkyl group or a $C_{6-30}$ aryl group, and is bonded to a silicon atom via an Si—C bond; each of $R^4$ and $R^6$ is an alkoxy group, an acyloxy group, or a halogen group; Y is an alkylene group, an NH group, or an oxygen atom; b is an integer of 1 to 3; c is an integer of 0 or 1; and d is an integer of 1 to 3.

Examples of the aforementioned alkyl group include, but are not limited to, $C_{1-18}$ alkyl groups, such as methyl group, ethyl group, n-propyl group, i-propyl group, cyclopropyl group, n-butyl group, i-butyl group, s-butyl group, t-butyl group, cyclobutyl group, 1-methyl-cyclopropyl group, 2-methyl-cyclopropyl group, n-pentyl group, 1-methyl-n-butyl group, 2-methyl-n-butyl group, 3-methyl-n-butyl group, 1,1-dimethyl-n-propyl group, 1,2-dimethyl-n-propyl group, 2,2-dimethyl-n-propyl group, 1-ethyl-n-propyl group, cyclopentyl group, 1-methyl-cyclobutyl group, 2-methyl-cyclobutyl group, 3-methyl-cyclobutyl group, 1,2-dimethyl-cyclopropyl group, 2,3-dimethyl-cyclopropyl group, 1-ethyl-cyclopropyl group, 2-ethyl-cyclopropyl group, n-hexyl group, 1-methyl-n-pentyl group, 2-methyl-n-pentyl group, 3-methyl-n-pentyl group, 4-methyl-n-pentyl group, 1,1-dimethyl-n-butyl group, 1,2-dimethyl-n-butyl group, 1,3-dimethyl-n-butyl group, 2,2-dimethyl-n-butyl group, 2,3-dimethyl-n-butyl group, 3,3-dimethyl-n-butyl group, 1-ethyl-n-butyl group, 2-ethyl-n-butyl group, 1,1,2-trimethyl-n-propyl group, 1,2,2-trimethyl-n-propyl group, 1-ethyl-1-methyl-n-propyl group, 1-ethyl-2-methyl-n-propyl group, cyclohexyl group, 1-methyl-cyclopentyl group, 2-methyl-cyclopentyl group, 3-methyl-cyclopentyl group, 1-ethyl-cyclobutyl group, 2-ethyl-cyclobutyl group, 3-ethyl-cyclobutyl group, 1,2-dimethyl-cyclobutyl group, 1,3-dimethyl-cyclobutyl group, 2,2-dimethyl-cyclobutyl group, 2,3-dimethyl-cyclobutyl group, 2,4-dimethyl-cyclobutyl group, 3,3-dimethyl-cyclobutyl group, 1-n-propyl-cyclopropyl group, 2-n-propyl-cyclopropyl group, 1-i-propyl-cyclopropyl group, 2-i-propyl-cyclopropyl group, 1,2,2-trimethyl-cyclopropyl group, 1,2,3-trimethyl-cyclopropyl group, 2,2,3-trimethyl-cyclopropyl group, 1-ethyl-2-methyl-cyclopropyl group, 2-ethyl-1-methyl-cyclopropyl group, 2-ethyl-2-methyl-cyclopropyl group, 2-ethyl-3-methyl-cyclopropyl group, hexyl group, heptyl group, octyl group, nonyl group, decyl group, undecyl group, dodecyl group, tridecyl group, tetradecyl group, pentadecyl group, hexadecyl group, heptadecyl group, and octadecyl group.

Examples of the alkylene group include alkylene groups derived from the aforementioned alkyl groups.

Examples of the aforementioned aryl group include $C_{6-30}$ aryl groups, such as phenyl group, naphthyl group, anthracene group, and pyrene group.

Examples of the alkenyl group include, but are not limited to, $C_{2-10}$ alkenyl groups, such as ethenyl group, 1-propenyl group, 2-propenyl group, 1-methyl-1-ethenyl group, 1-butenyl group, 2-butenyl group, 3-butenyl group, 2-methyl-1-propenyl group, 2-methyl-2-propenyl group, 1-ethylethenyl group, 1-methyl-1-propenyl group, 1-methyl-2-propenyl group, 1-pentenyl group, 2-pentenyl group, 3-pentenyl group, 4-pentenyl group, 1-n-propylethenyl group, 1-methyl-1-butenyl group, 1-methyl-2-butenyl group, 1-methyl-3-butenyl group, 2-ethyl-2-propenyl group, 2-methyl-1-butenyl group, 2-methyl-2-butenyl group, 2-methyl-3-butenyl group, 3-methyl-1-butenyl group, 3-methyl-2-butenyl group, 3-methyl-3-butenyl group, 1,1-dimethyl-2-propenyl group, 1-i-propylethenyl group, 1,2-dimethyl-1-propenyl group, 1,2-dimethyl-2-propenyl group, 1-cyclopentenyl group, 2-cyclopentenyl group, 3-cyclopentenyl group, 1-hexenyl group, 2-hexenyl group, 3-hexenyl group, 4-hexenyl group, 5-hexenyl group, 1-methyl-1-pentenyl group, 1-methyl-2-pentenyl group, 1-methyl-3-pentenyl group, 1-methyl-4-pentenyl group, 1-n-butylethenyl group, 2-methyl-1-pentenyl group, and 2-methyl-2-pentenyl group.

Examples of the aforementioned alkoxy group include, but are not limited to, $C_{1-10}$ alkoxy groups, such as methoxy group, ethoxy group, n-propoxy group, i-propoxy group, n-butoxy group, i-butoxy group, s-butoxy group, t-butoxy group, n-pentyloxy group, 1-methyl-n-butoxy group, 2-methyl-n-butoxy group, 3-methyl-n-butoxy group, 1,1-dimethyl-n-propoxy group, 1,2-dimethyl-n-propoxy group, 2,2-dimethyl-n-propoxy group, 1-ethyl-n-propoxy group, and n-hexyloxy group.

Examples of the aforementioned acyloxy group include, but are not limited to, $C_{2-10}$ acyloxy groups, such as methylcarbonyloxy group, ethylcarbonyloxy group, n-propylcarbonyloxy group, i-propylcarbonyloxy group, n-butylcarbonyloxy group, i-butylcarbonyloxy group, s-butylcarbonyloxy group, t-butylcarbonyloxy group, n-pentylcarbonyloxy group, 1-methyl-n-butylcarbonyloxy group, 2-methyl-n-butylcarbonyloxy group, 3-methyl-n-butylcarbonyloxy group, 1,1-dimethyl-n-propylcarbonyloxy group, 1,2-dimethyl-n-propylcarbonyloxy group, 2,2-dimethyl-n-propylcarbonyloxy group, 1-ethyl-n-propylcarbonyloxy group, 1-ethyl-n-propylcarbonyloxy group, n-hexylcarbonyloxy group, 1-methyl-n-pentylcarbonyloxy group, and 2-methyl-n-pentylcarbonyloxy group.

Examples of the aforementioned halogen group include fluorine, chlorine, bromine, and iodine.

Examples of the polyether group-containing organic group include polyether propyl groups containing an alkoxy group, such as $(CH_3O)_3SiC_3H_6(OC_2H_4)nOCH_3$. In this case, n may fall within a range of 1 to 100 or 1 to 10.

Examples of the epoxy group-containing organic group include 2-(3,4-epoxycyclohexyl)ethyl group and 3-glycidoxypropyl group.

The aforementioned (meth)acryloyl group refers to both an acryloyl group and a methacryloyl group. Examples of the (meth)acryloyl group-containing organic group include 3-methacryloxypropyl group and 3-acryloxypropyl group.

Examples of the mercapto group-containing organic group include 3-mercaptopropyl group.

Examples of the amino group-containing organic group include 2-aminoethyl group, 3-aminopropyl group, N-2-(aminoethyl)-3-aminopropyl group, N-(1,3-dimethyl-butylidene)aminopropyl group, N-phenyl-3-aminopropyl group, and N-(vinylbenzyl)-2-aminoethyl-3-aminopropyl group.

Examples of the ureido group-containing organic group include 3-ureidopropyl group.

Examples of the cyano group-containing organic group include 3-cyanopropyl group.

The silane compound of each of Formulae (2) and (3) is preferably a compound capable of forming a trimethylsilyl group on the surfaces of silica particles.

Examples of such a compound include those of the following Formulae.

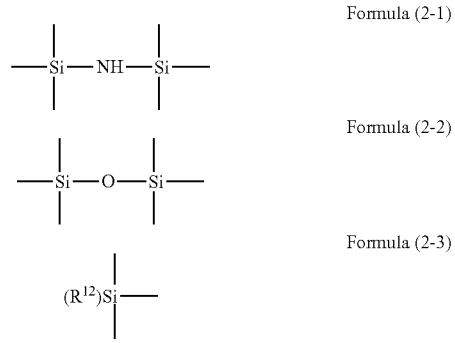

In the aforementioned Formulae, $R^{12}$ is an alkoxy group, such as a methoxy group or an ethoxy group. The aforementioned silane compound may be a silane compound available from Shin-Etsu Chemical Co., Ltd.

The hydroxyl group on the surfaces of silica particles (e.g., silanol group of silica particles) may be reacted with the aforementioned silane compound, to thereby coat the surfaces of silica particles with the silane compound via a siloxane bond. The reaction may be performed at a temperature falling within a range of 20° C. to the boiling point of the dispersion medium, for example, at a temperature falling within a range of 20° C. to 100° C. The reaction may be performed for about 0.1 to 6 hours.

The surfaces of silica particles may be coated with the aforementioned silane compound by adding the silane compound to the silica sol in such an amount that the number of silicon atoms in the silane compound corresponds to a coating amount of 0.1 atoms/nm² to 6.0 atoms/nm².

The hydrolysis of the aforementioned silane compound requires water. In the case of an aqueous solvent sol, water contained in the aqueous solvent is used for the hydrolysis. When the aqueous medium is replaced with the organic solvent (C), water remaining in the solvent may be used. For example, water present in the solvent in an amount of 0.01 to 1% by mass may be used. The hydrolysis may be performed with or without use of a catalyst.

The hydrolysis is performed without use of a catalyst when the surfaces of silica particles are present on an acidic side. When a catalyst is used, the hydrolysis catalyst may be a metal chelate compound, an organic acid, an inorganic acid, an organic base, or an inorganic base.

Examples of the metal chelate compound serving as a hydrolysis catalyst include triethoxy·mono(acetylacetonato) titanium and triethoxy·mono(acetylacetonato) zirconium. Examples of the organic acid serving as a hydrolysis catalyst include acetic acid and oxalic acid. Examples of the inorganic acid serving as a hydrolysis catalyst include hydrochloric acid, nitric acid, sulfuric acid, hydrofluoric acid, and phosphoric acid. Examples of the organic base serving as a hydrolysis catalyst include pyridine, pyrrole, piperazine, and quaternary ammonium salt. Examples of the inorganic base serving as a hydrolysis catalyst include ammonia, sodium hydroxide, and potassium hydroxide.

The organic acid is, for example, at least one organic acid selected from the group consisting of a divalent aliphatic carboxylic acid, an aliphatic oxycarboxylic acid, an amino acid, and a chelating agent. Examples of the divalent aliphatic carboxylic acid include oxalic acid, malonic acid, and succinic acid; examples of the aliphatic oxycarboxylic acid include glycolic acid, lactic acid, malic acid, tartaric acid, and citric acid; examples of the amino acid include glycine, alanine, valine, leucine, serine, and threonine; and examples of the chelating agent include ethylenediaminetetraacetic acid, L-aspartic acid-N,N-diacetic acid, and diethylenetriaminepentaacetic acid. Examples of the organic acid salt include alkali metal salts, ammonium salts, and amine salts of the aforementioned organic acids. Examples of the alkali metal include sodium and potassium.

The phosphate ester is, for example, at least one phosphate ester compound selected from the group consisting of phosphate esters of Formulae (4) to (6).

In Formulae (4) to (6), $X_1$, $X_2$, and $X_3$ are each a $C_{2-20}$ alkylene group; f, h, and j are each an integer of 1 to 100; e, g, and i are each an integer of 1 to 3; and $Y_1$, $Y_2$, and $Y_3$ are each a hydrogen atom, a $C_{1-20}$ alkyl group, a $C_{2-20}$ alkenyl group, or a (meth)acrylic group.

The phosphate ester used is preferably a polyoxyethylene alkyl ether phosphate ester. For example, the aforementioned phosphate ester may be a phosphate ester of Formula (4) wherein the terminal alkyl group ($Y_1$) is a $C_{6-10}$ or $C_{12-15}$ alkyl group. Such a product may be, for example, trade name Phosphanol RA-600 or RS-610 available from TOHO CHEMICAL INDUSTRY CO., LTD.

The surfactant used may be any of an anionic surfactant, a cationic surfactant, an amphoteric surfactant, and a nonionic surfactant.

Examples of the anionic surfactant used in the present invention include sodium salts and potassium salts of fatty acids, alkylbenzene sulfonate salts, higher alcohol sulfate ester salts, polyoxyethylene alkyl ether sulfate salts, α-sulfo fatty acid esters, α-olefin sulfonate salts, monoalkyl phosphate ester salts, and alkane sulfonate salts.

Examples of the alkylbenzene sulfonate salts include sodium salts, potassium salts, and lithium salts, such as sodium C10-C16 alkylbenzene sulfonates, C10-C16 alkylbenzene sulfonates, and sodium alkylnaphthalene sulfonates.

Examples of the higher alcohol sulfate ester salts include sodium dodecyl ($C_{12}$) sulfate (sodium laurylsulfate), triethanolamine laurylsulfate, and triethanolammonium laurylsulfate.

Examples of the polyoxyethylene alkyl ether sulfate salts include sodium polyoxyethylene styrenated phenyl ether sulfate, ammonium polyoxyethylene styrenated phenyl ether sulfate, sodium polyoxyethylene decyl ether sulfate, ammonium polyoxyethylene decyl ether sulfate, sodium polyoxyethylene lauryl ether sulfate, ammonium polyoxyethylene lauryl ether sulfate, sodium polyoxyethylene tridecyl ether sulfate, and sodium polyoxyethylene oleyl cetyl ether sulfate.

Examples of the α-olefin sulfonate salts include sodium α-olefin sulfonate.

Examples of the alkane sulfonate salts include sodium 2-ethylhexyl sulfate.

Examples of the cationic surfactant used in the present invention include alkyltrimethylammonium salts, dialkyldimethylammonium salts, alkyldimethylbenzylammonium salts, and amine salt-based agents.

The alkyltrimethylammonium salt is a quaternary ammonium salt, and has a chloride ion or a bromide ion as a counterion. Examples of the alkyltrimethylammonium salt include dodecyltrimethylammonium chloride, cetyltrimethylammonium chloride, cocoalkyltrimethylammonium chloride, and alkyl (C16-18) trimethylammonium chloride.

The dialkyldimethylammonium salt has two lipophilic main chains and two methyl groups. Examples of the dialkyldimethylammonium salt include bis(hydrogenated beef tallow) dimethylammonium chloride, didecyldimethylammonium chloride, dicocoalkyldimethylammonium chloride, di-hardened beef tallow alkyldimethylammonium chloride, and dialkyl (C14-18) dimethylammonium chloride.

The alkyldimethylbenzylammonium salt is a quaternary ammonium salt having one lipophilic main chain, two methyl groups, and one benzyl group. Examples of the alkyldimethylbenzylammonium salt include benzalkonium chloride, and alkyl (C8-18) dimethylbenzylammonium chloride.

The amine salt-based agent is prepared by substitution of a hydrogen atom of ammonia with one or more hydrocarbon groups. Examples of the amine salt-based agent include N-methylbishydroxyethylamine fatty acid ester hydrochloride.

Examples of the amphoteric surfactant used in the present invention include N-alkyl-β-alanine type alkylamino fatty acid salts, alkylcarboxybetaine type alkylbetaines, and N,N-dimethyldodecylamine oxide type alkylamine oxides. Specific examples thereof include lauryl betaine, stearyl betaine, 2-alkyl-N-carboxymethyl-N-hydroxyethylimidazolinium betaine, and lauryldimethylamine oxide.

Examples of the nonionic surfactant used in the present invention include polyoxyethylene alkyl ether, polyoxyethylene alkylphenol ether, alkyl glucoside, polyoxyethylene fatty acid ester, sucrose fatty acid ester, sorbitan fatty acid ester, polyoxyethylene sorbitan fatty acid ester, and fatty acid alkanolamide. Examples of the polyoxyethylene alkyl ether include polyoxyethylene dodecyl ether (polyoxyethylene lauryl ether), polyoxyalkylene lauryl ether, polyoxyethylene tridecyl ether, polyoxyalkylene tridecyl ether, polyoxyethylene myristyl ether, polyoxyethylene cetyl ether, polyoxyethylene oleyl ether, polyoxyethylene stearyl ether, polyoxyethylene behenyl ether, polyoxyethylene-2-ethylhexyl ether, and polyoxyethylene isodecyl ether.

Examples of the polyoxyethylene alkylphenol ether include polyoxyethylene styrenated phenyl ether, polyoxyethylene nonylphenyl ether, polyoxyethylene distyrenated phenyl ether, and polyoxyethylene tribenzylphenyl ether.

Examples of the alkyl glucoside include decyl glucoside and lauryl glucoside.

Examples of the polyoxyethylene fatty acid ester include polyoxyethylene monolaurate, polyoxyethylene monostearate, polyoxyethylene monooleate, polyethylene glycol distearate, polyethylene glycol dioleate, and polypropylene glycol dioleate.

Examples of the sorbitan fatty acid ester include sorbitan monocaprylate, sorbitan monolaurate, sorbitan monomyristate, sorbitan monopalmitate, sorbitan monostearate, sorbitan distearate, sorbitan tristearate, sorbitan monooleate, sorbitan trioleate, sorbitan monosesquioleate, and ethylene oxide adducts thereof.

Examples of the polyoxyethylene sorbitan fatty acid ester include polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate, polyoxyethylene sorbitan trioleate, and polyoxyethylene sorbitan triisostearate.

Examples of the fatty acid alkanolamide include coconut oil fatty acid diethanolamide, beef tallow fatty acid diethanolamide, lauric acid diethanolamide, and oleic acid diethanolamide.

Examples of other surfactants include polyoxyethylene polyoxypropylene glycol, polyoxyalkyl ether or polyoxyalkyl glycol such as polyoxyethylene fatty acid ester, polyoxyethylene hydrogenated castor oil ether, sorbitan fatty acid ester alkyl ether, alkyl polyglucoside, sorbitan monooleate, and sucrose fatty acid ester.

The production method for the aforementioned composition of the present invention includes the following steps (i) and (ii):
  step (i): a step of mixing photoactive metal oxide particles (A), a dispersant (B), and an organic solvent (C) other than a volatile aldehyde compound; and
  step (ii): a step of removing a $C_{1-2}$ alcohol from the liquid of mixture prepared in the step (i) so that the amount of the $C_{1-2}$ alcohol is 200 ppm or less in the entire solvent. The $C_{1-2}$ alcohol can be removed by, for example, evaporation or ultrafiltration.

The composition produced through the aforementioned production method has a solid content of 0.1 to 70% by mass. In the entire solid content, the amount of the photoactive metal oxide particles (A) may be adjusted to 80 to 99% by mass, and the amount of the dispersant (B) may be adjusted to 1 to 20% by mass.

The "solid content" as used herein refers to all components (except for the solvent component) contained in the composition. The term "solid content concentration" corresponds to the concentration of the solid content in the composition.

When 15 g of the aforementioned composition is irradiated with ultraviolet rays having a wavelength of 365 nm at an intensity of 0.4 mW/cm² for four hours, the amount of a volatile aldehyde compound generated in the composition is 2 ppm or less. Preferably, the amount of the aforementioned volatile aldehyde compound is controlled to 0.001 to 2 ppm or 0.01 to 1 ppm.

In general, the photocatalytic action of a composition can be reduced when the composition is stored in a brown container. However, a conventional composition may encounter a problem that a volatile aldehyde compound is generated by photocatalytic action when the composition is stored in a transparent container, when the composition is transferred from a container to an apparatus to be used, or when a substrate is coated with the composition.

In contrast, generation of a volatile aldehyde can be reduced in the composition of the present invention by controlling the amount of a $C_{1-2}$ alcohol contained in the composition to 200 ppm or less. It was found that the dispersant (B) is required for dispersing the photoactive metal oxide particles (A) in the organic solvent (C) having the aforementioned characteristic feature.

The composition of the present invention can be mixed with a thermosetting or photocurable resin, to thereby produce a varnish.

A varnish containing a curing agent such as an amine-based curing agent, an acid anhydride-based curing agent, or an acid generator-based curing agent (a thermal acid generator or a photoacid generator) may be produced into a cured product. A varnish containing the composition of the present invention, a resin, and a curing agent may be applied or charged onto a substrate, and the varnish may be subjected to heating, photoirradiation, or a combination thereof, to thereby form a cured product. The curable resin is, for example, a resin having a functional group such as an epoxy group or a (meth)acryloyl group.

In the case of a thermosetting varnish, a thermosetting agent may be incorporated in an amount of 0.5 to 1.5 equivalents, preferably 0.8 to 1.2 equivalents, relative to the functional group (e.g., epoxy group or (meth)acryloyl group) of the resin. The equivalent of the thermosetting agent relative to the curable resin is shown by the equivalent of the thermosetting agent relative to the functional group.

Examples of the thermosetting agent include a phenolic resin, an amine-based thermosetting agent, a polyamide resin, an imidazole compound, a polymercaptan, an acid anhydride, and a thermal acid generator. Particularly preferred is an acid anhydride-based thermosetting agent or an amine-based thermosetting agent. Such a thermosetting agent may be in the form of solid, since it can be used by dissolving it in a solvent. However, the thermosetting agent itself is preferably in the form of liquid at ambient temperature and ambient pressure, since the density of the resultant cured product may be reduced through evaporation of the solvent used, or the strength or water resistance of the cured product may be reduced through generation of pores.

Examples of the phenolic resin include phenolic novolac resin and cresol novolac resin.

Examples of the amine-based curing agent include piperidine, N,N-dimethylpiperazine, triethylenediamine, 2,4,6-tris(dimethylaminomethyl) phenol, benzyldimethylamine, 2-(dimethylaminomethyl) phenol, diethylenetriamine, triethylenetetramine, tetraethylenepentamine, diethylaminopropylamine, N-aminoethylpiperazine, di(1-methyl-2-aminocyclohexyl) methane, menthendiamine, isophoronediamine, diaminodicyclohexylmethane, 1,3-diaminomethylcyclohexane, xylenediamine, metaphenylenediamine, diaminodiphenylmethane, diaminodiphenylsulfone, 3,3'-diethyl-4,4'-diaminodiphenylmethane, and diethyltoluenediamine. Of these, preferred are diethylenetriamine, triethylenetetramine, tetraethylenepentamine, diethylaminopropylamine, N-aminoethylpiperazine, di(1-methyl-2-aminocyclohexyl) methane, menthenediamine, isophoronediamine, diaminodicyclohexylmethane, 3,3'-diethyl-4,4'-diaminodiphenylmethane, and diethyltoluenediamine, which are in the form of liquid.

Examples of the polyamide resin include polyamidoamine produced by condensation between a dimer acid and a polyamine and containing a primary amine and a secondary amine in the molecule.

Examples of the imidazole compound include 2-methylimidazole, 2-ethyl-4-methylimidazole, 1-cyanoethyl-2-undecylimidazolium trimellitate, and epoxy-imidazole adduct.

Examples of the polymercaptan include a product containing a polypropylene glycol chain and mercaptan groups present at the terminals of the chain, and a product containing a polyethylene glycol chain and mercaptan groups present at the terminals of the chain. The polymercaptan is preferably in the form of liquid.

The acid anhydride-based curing agent is preferably an anhydride of a compound containing a plurality of carboxyl groups in one molecule. Examples of such an acid anhydride-based curing agent include phthalic anhydride, trimellitic anhydride, pyromellitic anhydride, benzophenone tetracarboxylic anhydride, ethylene glycol bistrimellitate, glycerol tristrimellitate, maleic anhydride, tetrahydrophthalic anhydride, methyltetrahydrophthalic anhydride, endomethylenetetrahydrophthalic anhydride, methylendomethylenetetrahydrophthalic anhydride, methylbutenyltetrahydrophthalic anhydride, dodecenylsuccinic anhydride, hexahydrophthalic anhydride, methylhexahydrophthalic anhydride, succinic anhydride, methylcyclohexenedicarboxylic anhydride, and chlorendic anhydride.

Examples of the thermal acid generator include a sulfonium salt and a phosphonium salt. A sulfonium salt is preferably used. Examples of the sulfonium salt include compounds described below.

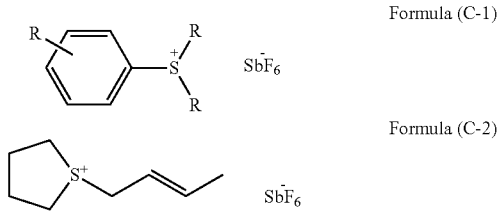

Formula (C-1)

Formula (C-2)

In Formula (C-1), R is a $C_{1-12}$ alkyl group or a $C_{6-20}$ aryl group. In particular, R is preferably a $C_{1-12}$ alkyl group.

Among these, preferred are methyltetrahydrophthalic anhydride, methyl-5-norbornene-2,3-dicarboxylic anhydride (methylnadic anhydride, methylhimic anhydride), hydrogenated methylnadic anhydride, methylbutenyltetrahydrophthalic anhydride, dodecenylsuccinic anhydride, methylhexahydrophthalic anhydride, and a mixture of methylhexahydrophthalic anhydride and hexahydrophthalic anhydride, which are in the form of liquid at ambient temperature and ambient pressure. These liquid acid anhydrides have a viscosity of about 10 mPas to 1,000 mPas as measured at 25° C.

A curing aid may also be used appropriately for producing the aforementioned cured product. Examples of the curing aid include organic phosphorus compounds such as triphenylphosphine and tributylphosphine, quaternary phosphonium salts such as ethyltriphenylphosphonium bromide and methyltriphenylphosphonium diethyl phosphate, 1,8-diazabicyclo(5,4,0) undecan-7-ene, a salt of 1,8-diazabicyclo(5,4,0) undecan-7-ene and octylic acid, zinc octylate, and quaternary ammonium salts such as tetrabutylammonium bromide. Such a curing aid may be incorporated in an amount of 0.001 to 0.1 parts by mass relative to 1 part by mass of the curing agent.

The composition is mixed with a resin, a curing agent, and, if desired, a curing aid, to thereby prepare a thermosetting varnish. The mixing may be performed with a stirring blade or a kneader in a reaction container.

The mixing is performed under heating at a temperature of 60° C. to 100° C. for 0.5 to 1 hour.

The resultant curable resin varnish (thermosetting composition) is a thermosetting coating composition and has a viscosity suitable for use as, for example, a liquid sealing material. The liquid thermosetting varnish can be prepared to have any viscosity, and can be used as a transparent sealing material for an LED, etc. so that any location thereof is partially sealed by, for example, by casting, potting, dispensing, or printing. The liquid thermosetting composition is directly applied in a liquid state onto an LED, etc. by the aforementioned method, and then dried and cured, to thereby produce an epoxy resin cured product.

The cured product is produced by applying the thermosetting varnish (thermosetting coating composition) to a substrate and heating it at a temperature of 80 to 200° C.

In the case of a photocurable varnish, a photocuring agent (photoacid generator) may be incorporated in an amount of 0.5 to 20% by mass, preferably 0.8 to 10% by mass, relative to a functional group (e.g., epoxy group or (meth)acryloyl group) of the resin.

No particular limitation is imposed on the photoacid generator, so long as it generates an acid directly or indirectly by photoirradiation.

Specific examples of the usable photoacid generator include a triazine compound, an acetophenone derivative compound, a disulfone compound, a diazomethane compound, a sulfonic acid derivative compound, onium salts such as an iodonium salt, a sulfonium salt, a phosphonium salt, and a selenium salt, a metallocene complex, and an iron arene complex.

Among the onium salts used as the aforementioned photoacid generator, examples of the iodonium salt include diphenyliodonium chloride, diphenyliodonium trifluoromethanesulfonate, diphenyliodonium mesylate, diphenyliodonium tosylate, diphenyliodonium bromide, diphenyliodonium tetrafluoroborate, diphenyliodonium hexafluoroantimonate, diphenyliodonium hexafluoroarsenate, bis(p-tert-butylphenyl)iodonium hexafluorophosphate, bis(p-tert-butylphenyl)iodonium mesylate, bis(p-tert-butylphenyl)iodonium tosylate, bis(p-tert-butylphenyl)iodonium trifluoromethanesulfonate, bis(p-tert-butylphenyl)iodonium tetrafluoroborate, bis(p-tert-butylphenyl)iodonium chloride, bis(p-chlorophenyl)iodonium chloride, bis(p-chlorophenyl)iodonium tetrafluoroborate, bis(alkylphenyl)iodonium salts such as bis(4-t-butylphenyl)iodonium hexafluorophosphate, alkoxycarbonylalkoxy-trialkylaryliodonium salts (e.g., 4-[(1-ethoxycarbonyl-ethoxy)phenyl]-(2,4,6-trimethylphenyl)-iodonium hexafluorophosphate), and bis(alkoxyaryl)iodonium salts (e.g., bis(alkoxyphenyl)iodonium salts such as (4-methoxyphenyl)phenyliodonium hexafluoroantimonate).

Examples of the sulfonium salt include triphenylsulfonium salts such as triphenylsulfonium chloride, triphenylsulfonium bromide, tri(p-methoxyphenyl) sulfonium tetrafluoroborate, tri(p-methoxyphenyl) sulfonium hexafluorophosphonate, tri(p-ethoxyphenyl) sulfonium tetrafluoroborate, triphenylsulfonium triflate, triphenylsulfonium hexafluoroantimonate, and triphenylsulfonium hexafluorophosphate, and sulfonium salts such as (4-phenylthiophenyl)diphenylsulfonium hexafluoroantimonate, (4-phenylthiophenyl)diphenylsulfonium hexafluorophosphate, bis[4-(diphenylsulfonio)phenyl]sulfide-bis-hexafluoroantimonate, bis[4-(diphenylsulfonio)phenyl]sulfide-bis-hexafluorophosphate, and (4-methoxyphenyl)diphenylsulfonium hexafluoroantimonate.

Examples of the phosphonium salt include phosphonium salts such as triphenylphosphonium chloride, triphenylphosphonium bromide, tri(p-methoxyphenyl)phosphonium tetrafluoroborate, tri(p-methoxyphenyl)phosphonium hexafluorophosphonate, tri(p-ethoxyphenyl)phosphonium tetrafluoroborate, 4-chlorobenzenediazonium hexafluorophosphate, and benzyltriphenylphosphonium hexafluoroantimonate.

Examples of the photoacid generator include selenium salts such as triphenylselenium hexafluorophosphate, and metallocene complexes such as (η5- or η6-isopropylbenzene)(η5-cyclopentadienyl)iron(II) hexafluorophosphate.

Other examples of the usable photoacid generator include compounds described below.

Formula (A-1)

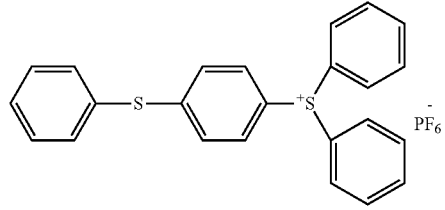

Formula (A-2)

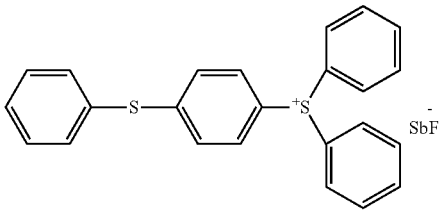

Formula (A-3)

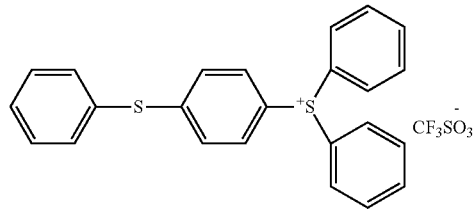

Formula (A-4)

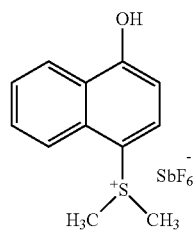

Formula (A-5)

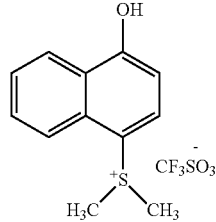

Formula (A-6)

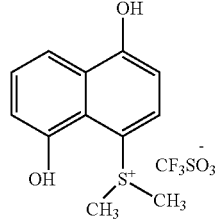

Formula (A-7)

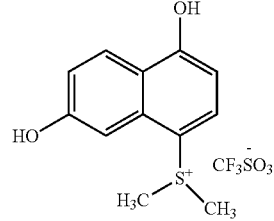

Formula (A-8)

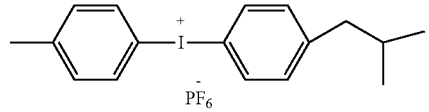

Formula (A-9)

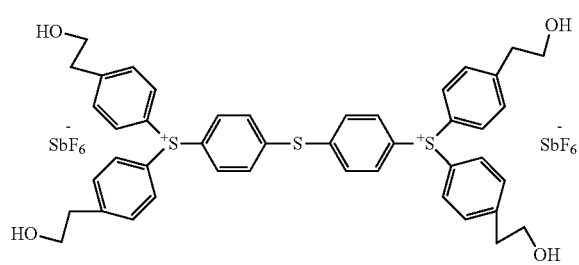

Formula (A-10)

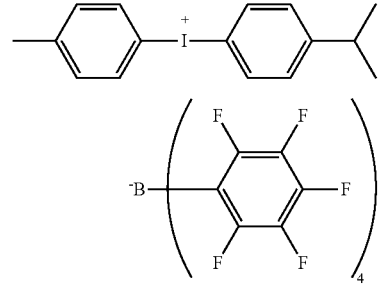

Formula (B-1)

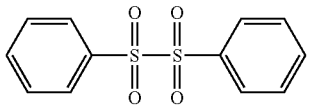

Formula (B-2)
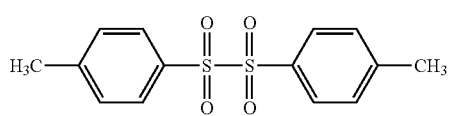
Formula (B-3)
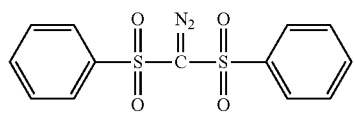
Formula (B-4)
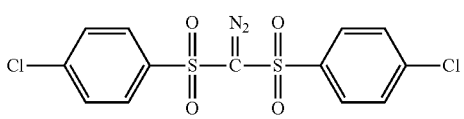
Formula (B-5)
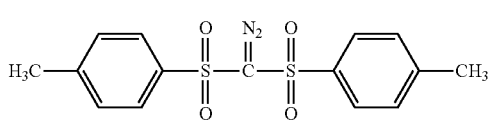
Formula (B-6)
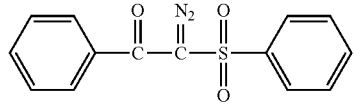
Formula (B-7)
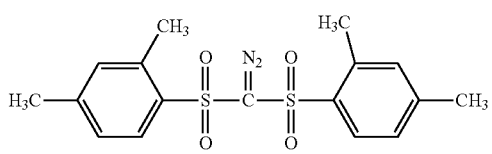
Formula (B-8)
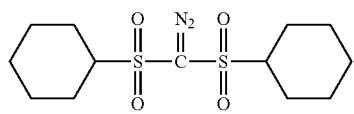
Formula (B-9)
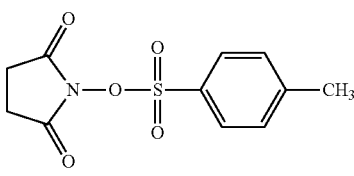
Formula (B-10)
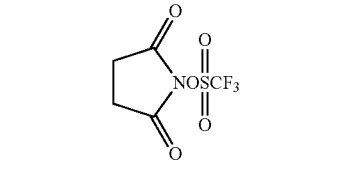
Formula (B-11)
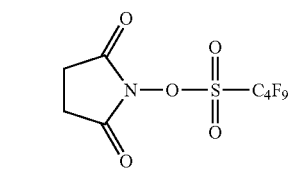
Formula (B-12)
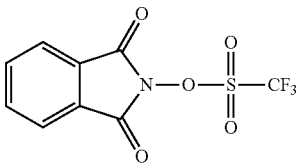
Formula (B-13)
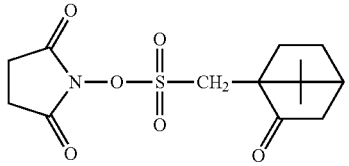
Formula (B-14)
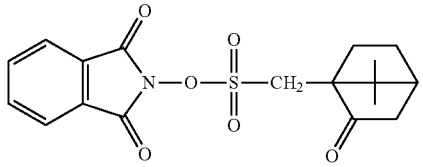
Formula (B-15)
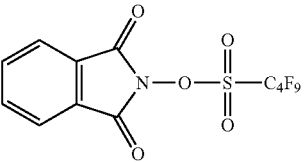
Formula (B-16)
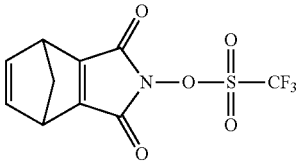
Formula (B-17)
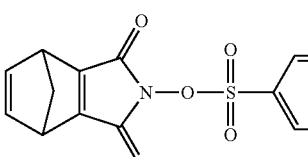
Formula (B-18)
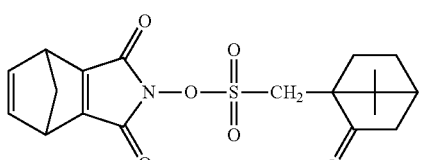
Formula (B-19)
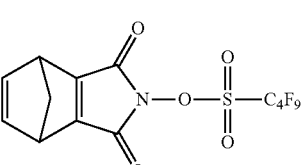
Formula (B-20)
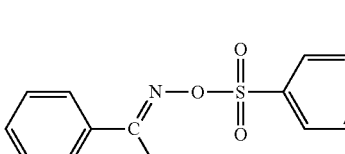

Formula (B-21)
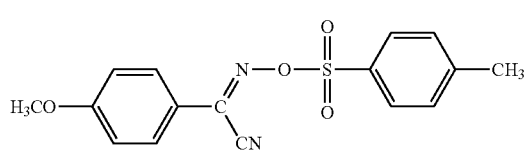
Formula (B-22)
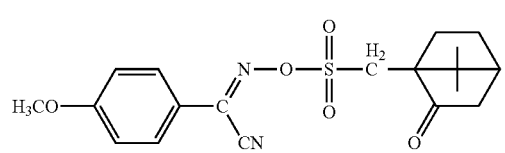
Formula (B-23)
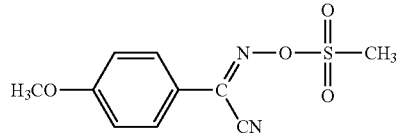
Formula (B-24)
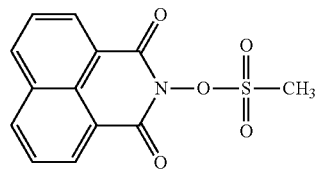
Formula (B-25)
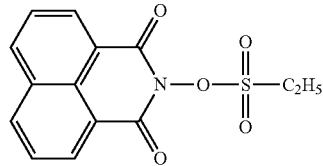
Formula (B-26)
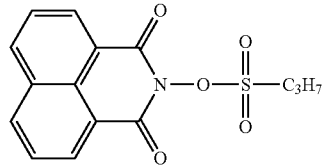
Formula (B-27)
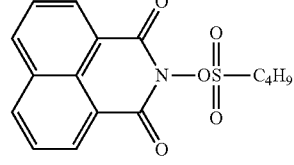
Formula (B-28)
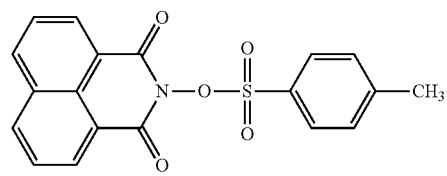
Formula (B-29)
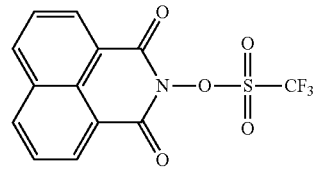
Formula (B-30)
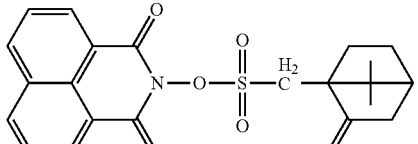
Formula (B-31)
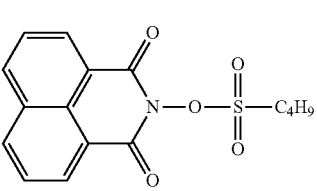
Formula (B-32)
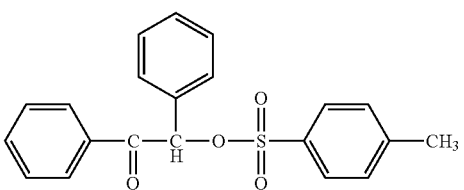
Formula (B-33)
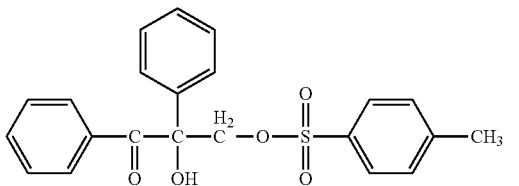
Formula (B-34)
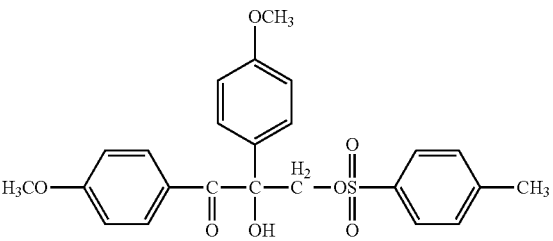
Formula (B-35)
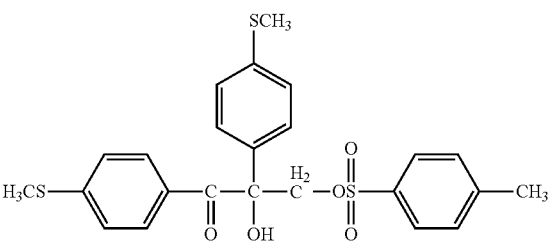
Formula (B-36)
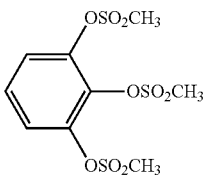

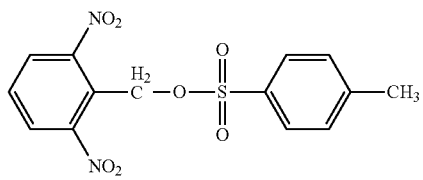
Formula (B-37)
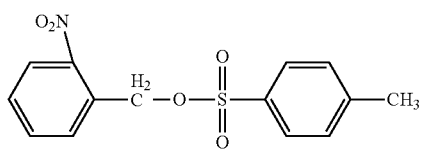
Formula (B-38)
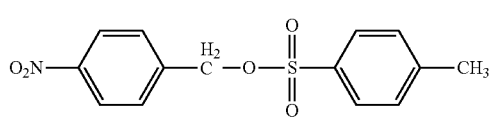
Formula (B-39)
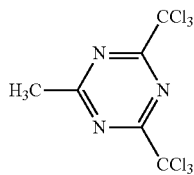
Formula (B-40)
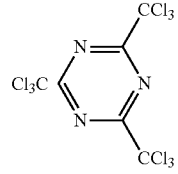
Formula (B-41)
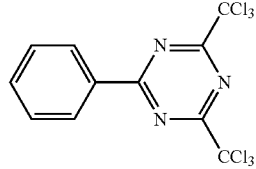
Formula (B-42)
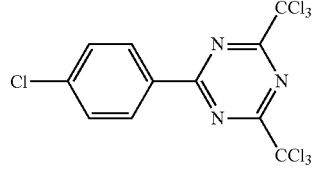
Formula (B-43)
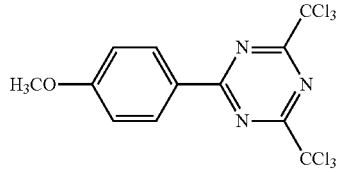
Formula (B-44)
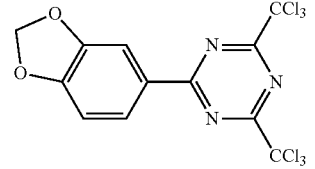
Formula (B-45)
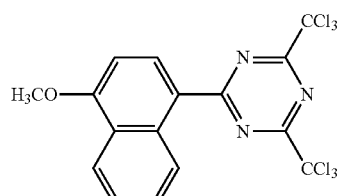
Formula (B-46)
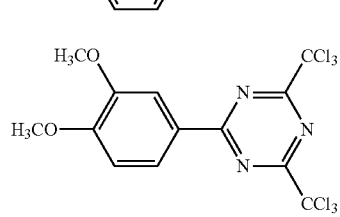
Formula (B-47)
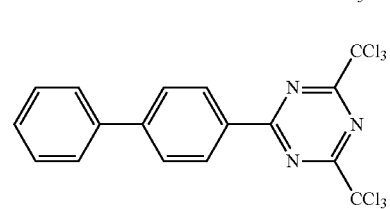
Formula (B-48)
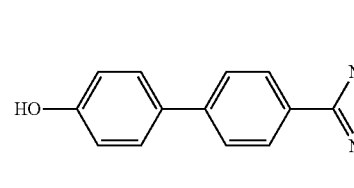
Formula (B-49)
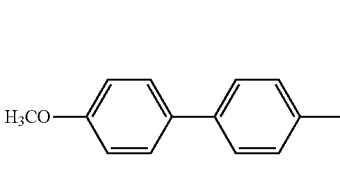
Formula (B-50)
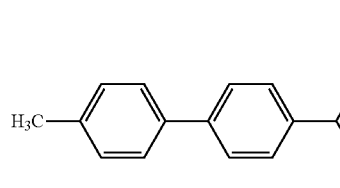
Formula (B-51)
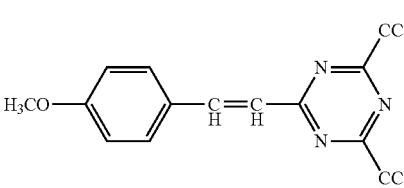
Formula (B-52)
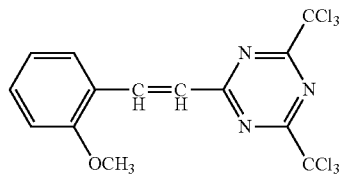
Formula (B-53)

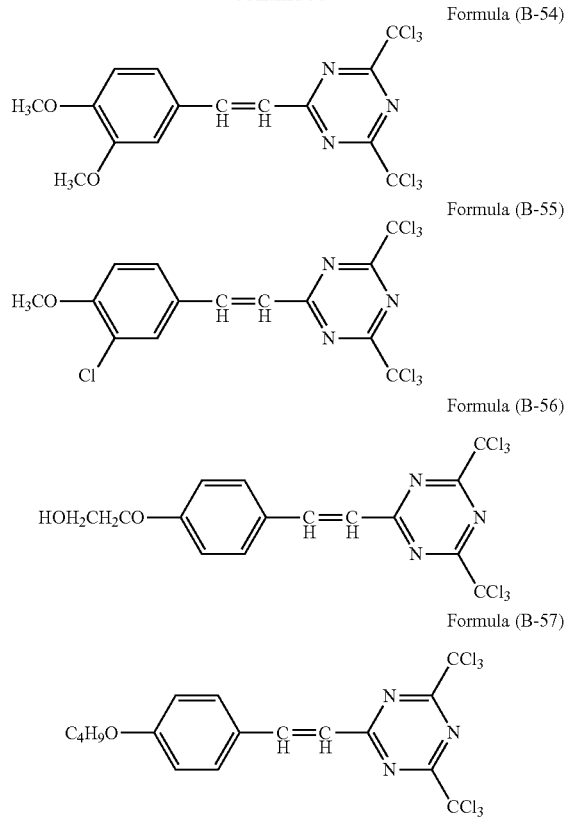

Formula (B-54)

Formula (B-55)

Formula (B-56)

Formula (B-57)

The photoacid generator is preferably a sulfonium salt compound or an iodonium salt compound. Examples of the anion species of such a compound include $CF_3SO_3^-$, $C_4F_9SO_3^-$, $C_8F_{17}SO_3^-$, camphorsulfonate anion, tosylate anion, $BF_4^-$, $PF_6^-$, $AsF_6^-$, and $SbF_6^-$. Particularly preferred are, for example, phosphorus hexafluoride anion and antimony hexafluoride anion, which exhibit strong acidity.

The composition and varnish of the present invention may contain a conventionally used additive as appropriate. Examples of such an additive include a pigment, a colorant, a thickener, a sensitizer, a defoamer, a leveling agent, a coatability improver, a lubricant, a stabilizer (e.g., an antioxidant, a heat stabilizer, or a light stabilizer), a plasticizer, a dissolution accelerator, a filler, and an antistatic agent. These additives may be used alone or in combination of two or more species.

Examples of the method for applying the composition and varnish of the present invention include flow coating, spin coating, spray coating, screen printing, casting, bar coating, curtain coating, roll coating, gravure coating, dipping, and slitting.

In the present invention, the light coating composition may be applied onto a substrate, and the composition may be cured by photoirradiation. The photoirradiation may be preceded or followed by heating.

Depending on the intended use of the cured product, the thickness of the coating film may be determined to fall within a range of about 0.01 μm to 10 mm. For example, when the cured product is used for a photoresist, the thickness may be about 0.05 to 10 μm (in particular, 0.1 to 5 μm). When the cured product is used for a printed wiring board, the thickness may be about 5 μm to 5 mm (in particular, 100 μm to 1 mm). When the cured product is used for an optical thin film, the thickness may be about 0.1 to 100 μm (in particular, 0.3 to 50 μm).

When a photoacid generator is used, the light used for irradiation or exposure may be, for example, γ-rays, X-rays, ultraviolet rays, or visible light rays. Generally, visible light or ultraviolet rays are used. In many cases, ultraviolet rays are particularly used. The light wavelength is, for example, 150 to 800 nm, preferably 150 to 600 nm, more preferably 200 to 400 nm, particularly about 300 to 400 nm. The irradiation light quantity, which varies with the thickness of the coating film, may be, for example, 2 to 20,000 $mJ/cm^2$, preferably about 5 to 5,000 $mJ/cm^2$. The light source may be selected depending on the type of the rays used for exposure. When ultraviolet rays are used, the light source may be, for example, a low-pressure mercury lamp, a high-pressure mercury lamp, an ultrahigh-pressure mercury lamp, a deuterium lamp, a halogen lamp, or laser light (e.g., helium-cadmium laser or excimer laser). The curing reaction of the aforementioned composition proceeds through such photoirradiation.

The heating of the coating film, which is performed when a thermal acid generator is used or, if necessary, performed after photoirradiation when a photoacid generator is used, is performed at, for example, 60 to 250° C., preferably at about 100 to 200° C. The heating time may be determined to fall within a range of 3 seconds or more (e.g., about 3 seconds to 5 hours). For example, the heating may be performed for 5 seconds to 2 hours, preferably about 20 seconds to 30 minutes. Generally, the heating may be performed for about 1 minute to 3 hours (e.g., 5 minutes to 2.5 hours).

When a pattern or an image is formed (e.g., in the case of production of a printed wiring board), the coating film formed on the substrate may be subjected to pattern exposure. The pattern exposure may be performed by scanning of laser light or photoirradiation via a photomask. A non-irradiated region (unexposed portion) generated through such pattern exposure may be developed (or dissolved) with a developer, to thereby form a pattern or an image.

The developer used may be an alkaline aqueous solution or an organic solvent.

Examples of the alkaline aqueous solution include aqueous solutions of alkali metal hydroxides, such as potassium hydroxide, sodium hydroxide, potassium carbonate, and sodium carbonate; aqueous solutions of quaternary ammonium hydroxides, such as tetramethylammonium hydroxide, tetraethylammonium hydroxide, and choline; and aqueous solutions of amines, such as ethanolamine, propylamine, and ethylenediamine.

The aforementioned alkaline developer used is generally an aqueous solution having an alkali content of 10% by mass or less, preferably, for example, an aqueous solution having an alkali content of 0.1 to 3.0% by mass. The aforementioned developer used may contain an alcohol or a surfactant. The amount of an alcohol or a surfactant is preferably 0.05 to 10 parts by mass relative to 100 parts by mass of the developer.

Among these, a 0.1 to 2.38% by mass aqueous tetramethylammonium hydroxide solution may be used.

The organic solvent used as a developer may be a common organic solvent. Examples of the organic solvent include acetone, acetonitrile, toluene, dimethylformamide, methanol, ethanol, isopropanol, propylene glycol methyl ether, propylene glycol ethyl ether, propylene glycol propyl ether, propylene glycol butyl ether, propylene glycol methyl ether acetate, propylene glycol ethyl ether acetate, propylene glycol propyl ether acetate, propylene glycol butyl ether acetate, ethyl lactate, and cyclohexanone. These organic solvents may be used alone or in combination of two or more species. In particular, propylene glycol methyl ether, propylene glycol methyl ether acetate, ethyl lactate, etc. are preferably used.

In the present invention, an adhesion improver may be added to the varnish for the purpose of improving the adhesion between the varnish and the substrate after development. Examples of the adhesion improver include chlorosilanes such as trimethylchlorosilane, dimethylvinylchlorosilane, methyldiphenylchlorosilane, and chloromethyldimethylchlorosilane; alkoxysilanes such as trimethylmethoxysilane, dimethyldiethoxysilane, methyldimethoxysilane, dimethylvinylethoxysilane, diphenyldimethoxysilane, and phenyltriethoxysilane; silazanes such as hexamethyldisilazane, N,N'-bis(trimethylsilyl) urea, dimethyltrimethylsilylamine, and trimethylsilylimidazole; silanes such as vinyltrichlorosilane, γ-chloropropyltrimethoxysilane, γ-aminopropyltriethoxysilane, γ-methacryloxypropyltrimethoxysilane, γ-glycidoxypropyltrimethoxysilane, and γ-(N-piperidinyl) propyltrimethoxysilane; heterocyclic compounds such as benzotriazole, benzimidazole, indazole, imidazole, 2-mercaptobenzimidazole, 2-mercaptobenzothiazole, 2-mercaptobenzoxazole, urazole, thiouracil, mercaptoimidazole, and mercaptopyrimidine; and urea or thiourea compounds such as 1,1-dimethylurea and 1,3-dimethylurea. The aforementioned adhesion improvers may be used alone or in combination of two or more species. The amount of such an adhesion improver added is generally 18% by mass or less, preferably 0.0008 to 9% by mass, more preferably 0.04 to 9% by mass in the solid content.

The composition and varnish of the present invention may contain a sensitizer. Examples of the usable sensitizer include anthracene, phenothiazene, perylene, thioxanthone, benzophenone, and thioxanthone. Examples of the sensitizing dye include thiopyrylium salt dyes, merocyanine dyes, quinoline dyes, styrylquinoline dyes, ketocoumarin dyes, thioxanthene dyes, xanthene dyes, oxonol dyes, cyanine dyes, rhodamine dyes, and pyrylium salt dyes. Particularly preferred is an anthracene-based sensitizer. When the sensitizer is used in combination with a cationic curing catalyst (radiation-sensitive cationic polymerization initiator), the sensitivity is drastically improved, and a radical polymerization initiation function is provided. Thus, the catalyst species can be simplified in the hybrid type (i.e., combination use of the cationic curing system and the radical curing system) of the present invention. An effective anthracene compound is specifically dibutoxyanthracene, dipropoxyanthraquinone, etc. The amount of the sensitizer added is 0.01 to 20% by mass, preferably 0.01 to 10% by mass in the solid content.

The varnish of the present invention can be photocured or thermally cured with use of a photoacid generator or a thermal acid generator. The use of a photoacid generator or a thermal acid generator leads to an improvement in the storage stability of the varnish, since a commonly used epoxy curing agent (e.g., an amine or an acid anhydride) is not used in the varnish, or the amount of such a curing agent (even if used) is very small in the varnish.

The aforementioned varnish can be applied to a photocationic polymerizable resin. The varnish exhibits a curing rate higher than that of a conventional liquid epoxy compound (e.g., an alicyclic epoxy compound having an epoxycyclohexyl ring). Such a high curing rate enables a reduction in the amount of an acid generator added, or the use of a weak acid-type acid generator. A reduction in the amount of an acid generator is important for preventing metal corrosion, since acid active species may remain after UV irradiation. Such a high curing rate enables curing of a thick film.

The curing by UV irradiation can be applied to a heat-sensitive material (equipment).

A thermosetting or photocurable material containing the epoxy compound-containing varnish of the present invention is characterized by, for example, rapid curing, transparency, or small curing shrinkage, and can be used for coating or bonding of electronic parts, optical parts, and precision mechanical parts. For example, the material can be used for bonding of lenses of mobile phones or cameras, optical devices such as light-emitting diodes (LED) and semiconductor lasers (LD), liquid crystal panels, biochips, camera parts such as lenses and prisms, magnetic parts of hard disks of personal computers, pickups of CD or DVD players (i.e., a part that captures optical information reflected from the disc), speaker cones and coils, motor magnets, circuit boards, electronic parts, parts inside the engine of automobiles, etc.

When the thermosetting or photocurable material is used for hard coating materials for surface protection of automobile bodies, lamps, electrical appliances, building materials, plastics, etc., the material can be applied to, for example, automobile bodies, motorcycle bodies, headlight lenses and mirrors, plastic lenses for eyeglasses, mobile phones, game consoles, optical films, and ID cards.

When the thermosetting or photocurable material is used for ink materials for printing on metals such as aluminum and plastics, etc., the material can be applied to, for example, cards such as credit cards and membership cards, electrical appliance and OA equipment switches, keyboard printing ink, and inks of inkjet printers for CDs, DVDs, etc.

The thermosetting or photocurable material can be applied to a technique for producing complicated three-dimensional objects by curing a resin in combination with three-dimensional CAD, applied to optical modeling such as model production of industrial products, and applied to optical fiber coating, adhesion, optical waveguide, thick film resist, etc.

The cured product-forming composition containing the composition of the present invention can be suitably used as a semiconductor sealing material, an adhesive for electronic materials, a printed wiring board material, an interlayer insulating film material, an insulating resin for electronic materials such as sealing materials for power modules, and an insulating resin for use in high-voltage equipment, such as a generator coil, a transformer coil, or a gas-insulated switchgear.

Examples of the composition of the present invention will be described below, but the present invention is not limited thereto.

For example, the present invention is exemplified by a sol containing photoactive titanium oxide particles having an average particle diameter of 5 to 500 nm, wherein the ratio by mole of quaternary ammonium ion/titanium atom is 0.1 to 1.5, and the ratio by mole of amino acid/titanium atom is 0.1 to 1.5. The aforementioned average particle diameter may be determined by dynamic light scattering.

The coexistence of a quaternary ammonium ion and an amino acid enables the stable existence of titanium oxide particles. In particular, the coexistence is effective in a sol containing titanium oxide particles having an average particle diameter of more than 100 nm (e.g., a particle diameter as large as 100 to 500 nm, 110 to 300 nm, or 110 to 250 nm) as determined by dynamic light scattering.

Examples of the raw material of titanium oxide contained in the aforementioned sol include titanium oxide particles prepared by the pulverization method, titanium oxide particles prepared by hydrolysis of titanium sulfate or titanium oxysulfate, titanium oxide particles prepared by polymerization of titanium hydroxide, and titanium oxide particles prepared by hydrolysis and condensation of alkoxytitanium.

The aforementioned sol containing titanium oxide particles may be a sol containing core-shell metal oxide particles prepared by coating the surfaces of the aforementioned titanium oxide particles serving as a core with silica-containing metal oxide particles, wherein the titanium oxide particles contain titanium oxide in an amount of 50% by mole or more and 99% by mole or less in the entire metal oxides. Coating of the surfaces of the titanium oxide particles serving as a core can reduce the photoactivity of titanium oxide. The coating target is suitably titanium oxide particles containing titanium oxide in an amount of 50% by mole or more and 99% by mole or less in the entire metal oxides. The metal oxide particles used for coating may be particles of at least one metal oxide selected from the group consisting of silicon dioxide, tin oxide, antimony oxide, tungsten oxide, aluminum oxide, and zirconium oxide, or particles of a composite metal oxide. The coating amount may be the aforementioned amount.

The aforementioned quaternary ammonium ion used is preferably based on tetramethylammonium hydroxide or tetraethylammonium hydroxide. The use of a water-soluble basic substance can contribute to promotion of the hydrolysis of a raw material or the dispersibility of the resultant titanium oxide particles.

The aforementioned amino acid may be glycine, alanine, valine, norvaline, leucine, norleucine, isoleucine, phenylalanine, tyrosine, diiodotyrosine, surinamine, threonine, serine, proline, hydroxyproline, tryptophan, thyroxine, methionine, cystine, cysteine, α-aminobutyric acid, aspartic acid, glutamic acid, asparagine, glutamine, lysine, hydroxylysine, arginine, or histidine. In particular, glycine is useful. Any of these amino acids is water-soluble and cooperates with a quaternary ammonium ion, to thereby contribute to the dispersion stability of titanium oxide particles during formation of the particles. Thus, the growth of titanium oxide particles is promoted, and titanium oxide particles having a large particle diameter are formed, resulting in a titanium oxide sol containing stably dispersed particles.

The aforementioned titanium oxide-containing sol may be produced by hydrothermal reaction of an aqueous medium containing a titanium oxide, a quaternary ammonium hydroxide, and an amino acid at 100 to 300° C.

For the aforementioned hydrothermal reaction, heat treatment may be performed with an autoclave apparatus for about 0.1 to 10 hours. The hydrothermal treatment may be preceded by preliminary stirring at a temperature of 60 to 100° C. or thereabouts.

EXAMPLES

The physical properties of a composition were determined by the methods described below.

[Viscosity] The viscosity was determined with an Ostwald viscometer (25° C.).

[Water content] The water content was determined by the Karl Fischer titration method.

[Average particle diameter by dynamic light scattering (particle diameter by dynamic light scattering)] A composition was diluted with a dispersion solvent, and the particle diameter was measured with a dynamic light scattering measuring apparatus Zetasizer (available from Malvern Instruments Ltd.) using the parameter of the solvent.

The methanol content and formaldehyde content of each of the compositions prepared in Examples and Comparative Examples were measured by the measurement methods described below and then evaluated.

(1) Methanol Content

The methanol content of a composition was determined with a gas chromatograph (GC-2014, available from Shimadzu Corporation) under the following conditions.

Column: 3 mm×1 m glass column
Filler: Polar Pack Q
Column temperature: 130 to 230° C. (temperature increase rate: 8° C./min)
Carrier: $N_2$ 40 mL/min
Detector: FID
Injection amount: 1 μL
Internal standard: acetonitrile (2) Formaldehyde Content Particles and a solvent were separated by centrifugal ultrafiltration, and then the solvent was 10-fold diluted with methanol. To 1 mL of the diluted solution were added 0.02 mL of 20% aqueous phosphoric acid solution and 0.5 mL of 1,000 ppm DNPH acetonitrile solution. The resultant solution was heated with an aluminum block heater at 60° C. for 60 minutes. The resultant solution was subjected to quantification with a high-performance liquid chromatograph (ACQUITY Ultra Performance LC, available from Waters) under the following conditions.

Column: ACQUITY UPLC BEH c18 1.7 μm 2.1×100 mm
Flow rate: 0.3 mL/min
Mobile phase: acetonitrile/water=55/45
Injection amount: 3 μL
Column temperature: 40° C.
Detector: PDA (360 nm)

The calibration curve was prepared with Aldehydes-2,4-DNPH standard stock solution (for HPLC) available from Kanto Chemical Co., Inc. For correction of DNPH reaction rate, the formaldehyde standard solution was diluted to 0.1 ppm, and a preliminarily treated sample was measured through the aforementioned procedure.

(3) Light Resistance Test 15 g of a composition was placed in a screw vial and irradiated with UV rays by using a UV lamp (Handy UV Lamp SLUV-6, available from AS ONE CORPORATION) for four hours, and then the amount of formaldehyde contained in the liquid was analyzed through the aforementioned procedure. In this case, the UV wavelength was 365 nm, and the UV intensity was 0.4 mW/cm$^2$.

Referential Example 1: Preparation of Titanium Oxide-Stannic Oxide Composite Oxide Colloidal Particles (A1) Serving as Core 319.5 g of 25% by mass aqueous tetramethylammonium hydroxide solution was dissolved in 947.1 g of pure water, and then 14.8 g of metastannic acid (12.5 g in terms of $SnO_2$), 236.6 g of titanium tetraisopropoxide (66.6 g in terms of $TiO_2$), and 82.0 g of oxalic acid dihydrate (58.5 g in terms of oxalic acid) were added to the solution with stirring. The resultant mixture was retained at 80° C. for two hours, and then the pressure was reduced to 580 Torr, followed by retention for two hours, to thereby prepare a mixed solution. The mixed solution was added to a glass-lined autoclave container, and hydrothermal treatment was performed at 140° C. for five hours. The resultant product was cooled to room temperature and then removed from the container. The resultant sol was an acidic aqueous dispersion sol of titanium oxide-stannic oxide composite oxide colloidal particles (A1), and was found to have a pH of 3.9, a total metal oxide concentration ($TiO_2$ and $SnO_2$) of 5.0% by mass, and an average particle diameter as determined by dynamic light scattering (particle diameter by dynamic light scattering) of 16 nm. The resultant sol was dried at 110° C., and the resultant powder was subjected to X-ray diffraction analysis, indicating a rutile type crystal.

Referential Example 2: Preparation of Silicon Dioxide-Stannic Oxide Composite Oxide Colloidal Particles (B1) Serving as Coating Material 77.2 g of JIS No. 3 sodium silicate (29.8% by mass in terms of $SiO_2$) was dissolved in 668.8 g of pure water, and then 20.9 g of sodium stannate $NaSnO_3·H_2O$ (55.1% by mass in terms of $SnO_2$) was dissolved therein. The resultant aqueous solution was allowed to pass through a column charged with a hydrogen-type cation exchange resin (Amberlite (registered trademark) IR-120B). Subsequently, 7.2 g of diisopropylamine was added to the resultant aqueous dispersion sol. The resultant sol was an alkaline aqueous dispersion sol of silicon dioxide-stannic oxide composite oxide colloidal particles (B1), and was found to have a pH of 8.0, a total metal oxide concentration ($SiO_2$ and $SnO_2$) of 1.7% by mass, and a primary particle diameter of 1 to 4 nm as determined by observation with a transmission electron microscope.

Production Example 1: Preparation of Silicon Dioxide-Stannic Oxide Composite Oxide-Modified Titanium Oxide-Stannic Oxide-Zirconium Oxide Composite Oxide Colloidal Particles (C1)

82.7 g of zirconium oxychloride (21.2% by mass in terms of $ZrO_2$) was diluted with 501.1 g of pure water, to thereby prepare 583.8 g of an aqueous zirconium oxychloride solution (3.0% by mass in terms of $ZrO_2$), and 1,516.2 g of the aqueous dispersion sol of titanium oxide-stannic oxide composite oxide colloidal particles (A1) prepared in Referential Example 1 was added to the aqueous zirconium oxychloride solution with stirring. Subsequently, the resultant mixture was heated at 95° C. for hydrolysis, to thereby yield an aqueous dispersion sol of titanium oxide-stannic oxide-zirconium oxide composite oxide colloidal particles having surfaces provided with a zirconium oxide thin film layer. Thereafter, 2,041.2 g of the resultant aqueous dispersion sol was added to 1,763.3 g of the alkaline aqueous dispersion sol of silicon dioxide-stannic oxide composite oxide colloidal particles (B1) prepared in Referential Example 2 with stirring, and the resultant mixture was allowed to pass through a column charged with 500 mL of an anion exchange resin (Amberlite (registered trademark) IRA-410, available from ORGANO CORPORATION). Subsequently, the aqueous dispersion sol passed through the column was heated at 95° C. for three hours, and then concentrated by the ultrafiltration membrane method, to thereby prepare an aqueous dispersion sol of silicon dioxide-stannic oxide composite oxide-modified titanium oxide-stannic oxide-zirconium oxide composite oxide colloidal particles (C1). The aqueous dispersion sol was found to have a pH of 5.2, a total metal oxide ($TiO_2$, $ZrO_2$, $SnO_2$, and $SiO_2$) concentration of 30.5% by mass, a viscosity of 5.0 mPa·s, and an average particle diameter as determined by dynamic light scattering (DLS) (particle diameter by dynamic light scattering) of 20 nm.

Referential Example 3: Preparation of Zirconium Oxide-Stannic Oxide Composite Oxide Colloidal Particles (A2) Serving as Core 293.7 g of an aqueous tetramethylammonium hydrogen carbonate solution (42.4% by mass in terms of tetramethylammonium hydroxide) was diluted with 111.5 g of pure water, and 168.4 g of zirconium oxycarbonate powder (40.1% by mass in terms of $ZrO_2$) was gradually added to the aqueous solution with stirring. After completion of the addition, the resultant mixture was heated to 85° C., and 9.6 g of metastannic acid (86.0% by mass in terms of $SnO_2$) was gradually added to the mixture, followed by aging at 105° C. for five hours, and then hydrothermal treatment at 145° C. for five hours. Subsequently, the resultant sol was washed and concentrated with an ultrafiltration apparatus with addition of pure water. The resultant sol was an alkaline aqueous dispersion sol of zirconium oxide-stannic oxide composite oxide colloidal particles (A2), and was found to have a pH of 9.4, a total metal oxide concentration (total of $ZrO_2$ and $SnO_2$) of 5.0% by mass, and an average particle diameter as determined by dynamic light scattering (particle diameter by dynamic light scattering) of 15 nm.

Production Example 2: Preparation of Silicon Dioxide-Stannic Oxide Composite Oxide-Modified Zirconium Oxide-Stannic Oxide Composite Oxide Colloidal Particles (C2)

830.4 g of the alkaline aqueous dispersion sol of silicon dioxide-stannic oxide composite oxide colloidal particles (B1) prepared in Referential Example 2 was added to 1,411.7 g of the alkaline aqueous dispersion sol of zirconium oxide-stannic oxide composite oxide colloidal particles (A2) prepared in Referential Example 3 with stirring. Subsequently, the resultant mixture was heated to 95° C. and retained for two hours, and then allowed to pass through a column charged with a hydrogen-type cation exchange resin (Amberlite (registered trademark) IR-120B). Thereafter, the sol passed through the column was concentrated by the ultrafiltration membrane method, to thereby prepare an aqueous dispersion sol of silicon dioxide-stannic oxide composite oxide-modified zirconium oxide-stannic oxide composite oxide colloidal particles (C2). The aqueous dispersion sol was found to have a pH of 5.0, a total metal oxide ($ZrO_2$, $SnO_2$, and $SiO_2$) concentration of 30% by mass, a viscosity of 5.3 mPa·s, and an average particle diameter as determined by dynamic light scattering (DLS) (particle diameter by dynamic light scattering) of 20 nm.

Referential Example 4: Preparation of Stannic Oxide Colloidal Particles (A3) Serving as Core 64.0 g of oxalic acid dihydrate (45.7 g in terms of oxalic acid) was dissolved in 723.3 g of pure water, and the solution was heated to 70° C. with stirring. Thereafter, 290.3 g of 35% hydrogen peroxide water and 128.1 g of metallic tin powder (99.7% in terms of $SnO_2$) were added to the solution. Hydrogen peroxide water and metallic tin were alternately added in 10 divisions. Firstly, 29.0 g of 35% hydrogen peroxide water was added, and then 12.8 g of metallic tin powder was added. This operation was repeated after waiting for the reaction to finish (10 to 15 minutes). Two hours were required for completion of the addition. After completion of the addition, the mixture was heated for two hours while the liquid temperature was maintained at 90° C., to thereby complete the reaction. Subsequently, 394.5 g of 35% hydrogen peroxide water was added to the mixture, and the mixture was retained at 90° C. for five hours. Then, 5.1 g of isopropylamine was added to the mixture, and the mixture was retained at 50° C. for three hours. Thereafter, the resultant mixture was allowed to pass through a column charged with 500 mL of an anion exchange resin (Amberlite (registered trademark) IRA-410). The resultant sol was an alkaline aqueous dispersion sol of stannic oxide composite oxide colloidal particles (A3), and was found to have a pH of 11.0, an $SnO_2$ concentration of 4.0% by mass, and an average particle diameter as determined by dynamic light scattering (particle diameter by dynamic light scattering) of 20 nm.

Production Example 3: Preparation of Silicon Dioxide-Stannic Oxide Composite Oxide-Modified Stannic Oxide Colloidal Particles (C3)

514.9 g of the alkaline aqueous dispersion sol of silicon dioxide-stannic oxide composite oxide colloidal particles (B1) prepared in Referential Example 2 was added to 1,458.8 g of the aqueous dispersion sol of stannic oxide colloidal particles (A3) prepared in Referential Example 4 with stirring. Subsequently, the resultant mixture was heated to 95° C. and retained for two hours, and then allowed to pass through a column charged with a hydrogen-type cation exchange resin (Amberlite (registered trademark) IR-120B). Thereafter, the sol passed through the column was concentrated by the ultrafiltration membrane method, to thereby prepare an aqueous dispersion sol of silicon dioxide-stannic oxide composite oxide-modified stannic oxide colloidal particles (C3). The aqueous dispersion sol was found to have a total metal oxide ($SnO_2$ and $SiO_2$) concentration of 30.5% by mass, a viscosity of 4.8 mPa·s, and an average particle diameter as determined by dynamic light scattering (DLS) (particle diameter by dynamic light scattering) of 18 nm.

Referential Example 5: Preparation of Titanium Oxide Colloidal Particles (A4) Serving as Core 1,431.0 g of pure water was added to a 5 L container, and 315.0 g of 35% by mass aqueous tetraethylammonium hydroxide solution, 39.6 g of glycine, and 213.2 g of titanium tetraisopropoxide (59.9 g in terms of $TiO_2$) were added to the pure water with stirring. In the resultant mixed solution, the ratio by mole of tetraethylammonium hydroxide/titanium atom was 1.00, and the ratio by mole of glycine/titanium atom was 0.70. The mixed solution was retained at 90° C. for two hours, and then retained at 95° C. for five hours, to thereby prepare a titanium mixed solution. The thus-prepared titanium mixed solution was found to have a pH of 11.1 and a $TiO_2$ concentration of 3.0% by mass. Subsequently, 1,500 g of the titanium mixed solution was added to a 3 L SUS-made autoclave container, and hydrothermal treatment was performed at 150° C. for five hours. After the hydrothermal treatment, the container was cooled to room temperature, and the resultant solution was removed from the container. The removed solution was a milky white aqueous dispersion of titanium oxide colloidal particles. The dispersion was found to have a pH of 12.2, a $TiO_2$ concentration of 3.0% by mass, and an average particle diameter as determined by dynamic light scattering (DLS) (particle diameter by dynamic light scattering) of 140 nm.

Production Example 4: Preparation of Silicon Dioxide-Stannic Oxide Composite Oxide-Modified Titanium Oxide Colloidal Particles (C4)

247.1 g of the alkaline aqueous dispersion sol of silicon dioxide-stannic oxide composite oxide colloidal particles (B1) prepared in Referential Example 2 was added to 1,400.0 g of the aqueous dispersion sol of titanium oxide colloidal particles (A4) prepared in Referential Example 5 with stirring. Subsequently, the resultant mixture was heated to 95° C. and retained for two hours, and then allowed to pass through a column charged with a hydrogen-type cation exchange resin (Amberlite (registered trademark) IR-120B). Thereafter, the sol passed through the column was concentrated by the ultrafiltration membrane method, to thereby prepare an aqueous dispersion sol of silicon dioxide-stannic oxide composite oxide-modified titanium oxide colloidal particles (C4). The aqueous dispersion sol was found to have a total metal oxide ($TiO_2$, $SnO_2$, and $SiO_2$) concentration of 30.5% by mass, a viscosity of 3.5 mPa·s, and an average particle diameter as determined by dynamic light scattering (DLS) (particle diameter by dynamic light scattering) of 128 nm.

Example 1

69.5 g of IPA (isopropyl alcohol) and 1.52 g of polyoxyethylene alkyl ether phosphate (trade name RA-600, available from TOHO CHEMICAL INDUSTRY CO., LTD.) were added to 100 g of the aqueous dispersion sol of silicon dioxide-stannic oxide composite oxide-modified titanium oxide-stannic oxide-zirconium oxide composite oxide colloidal particles (C1) prepared in Production Example 1 with stirring, to thereby modify the surfaces of the particles. Subsequently, the dispersion medium of the resultant aqueous dispersion sol was replaced with IPA by using a rotary evaporator, to thereby prepare an IPA dispersion sol of silicon dioxide-stannic oxide composite oxide-modified titanium oxide-stannic oxide-zirconium oxide composite oxide colloidal particles (C1). The amount of methanol remaining in the solvent was reduced at this stage. The IPA dispersion sol was found to have a pH of 5.0, a total metal oxide ($TiO_2$, $ZrO_2$, $SnO_2$, and $SiO_2$) concentration of 20.5% by mass, a viscosity of 2.3 mPa·s, and an average particle diameter as determined by dynamic light scattering (DLS) (particle diameter by dynamic light scattering) of 22 nm. The metal oxide particles were found to contain $SnO_2$ in an amount of 11.4% by mole, $TiO_2$ in an amount of 54.8% by mole, $ZrO_2$ in an amount of 10.1% by mole, and $SiO_2$ in an amount of 23.6% by mole.

In this case, the residual methanol content (methanol in the composition corresponds to methanol in the dispersion medium) was 11 ppm, and the formaldehyde content before or after the light resistance test was less than 1 ppm.

Example 2

A sol was prepared in the same manner as in Example 1, except that the solvent was replaced with propylene glycol monomethyl ether (PGME). The resultant PGME dispersion sol was found to have a pH of 4.2, a total metal oxide ($TiO_2$, $ZrO_2$, $SnO_2$, and $SiO_2$) concentration of 30.5% by mass, a viscosity of 4.5 mPa·s, and an average particle diameter as determined by dynamic light scattering (DLS) (particle diameter by dynamic light scattering) of 26 nm. The metal oxide particles were found to contain $SnO_2$ in an amount of 11.4% by mole, $TiO_2$ in an amount of 54.8% by mole, $ZrO_2$ in an amount of 10.1% by mole, and $SiO_2$ in an amount of 23.6% by mole.

In this case, the residual methanol content (methanol in the composition corresponds to methanol in the dispersion medium) was 10 ppm, and the formaldehyde content before or after the light resistance test was less than 1 ppm.

Example 3

30.5 g of 5% aqueous citric acid solution was added to 100 g of the aqueous dispersion sol of silicon dioxide-stannic oxide composite oxide-modified titanium oxide-stannic oxide-zirconium oxide composite oxide colloidal particles (C1) prepared in Production Example 1 with stirring.

Subsequently, the sol was heated at 90° C. for two hours, to thereby modify the surfaces of the particles with citric acid. The dispersion medium of the resultant aqueous dispersion sol was replaced with n-propanol by using a rotary evaporator, to thereby prepare an n-propanol dispersion sol of silicon dioxide-stannic oxide composite oxide-modified titanium oxide-stannic oxide-zirconium oxide composite oxide colloidal particles (C1). The amount of methanol remaining in the solvent was reduced at this stage. The n-propanol dispersion sol was found to have a pH of 3.5, a total metal oxide ($TiO_2$, $ZrO_2$, $SnO_2$, and $SiO_2$) concentration of 19.5% by mass, a viscosity of 2.2 mPa·s, and an average particle diameter as determined by dynamic light scattering (DLS) (particle diameter by dynamic light scattering) of 18 nm. The metal oxide particles were found to contain $SnO_2$ in an amount of 11.4% by mole, $TiO_2$ in an amount of 54.8% by mole, $ZrO_2$ in an amount of 10.1% by mole, and $SiO_2$ in an amount of 23.6% by mole.

In this case, the residual methanol content (methanol in the composition corresponds to methanol in the dispersion medium) was 5 ppm, and the formaldehyde content before or after the light resistance test was less than 1 ppm.

Example 4

The procedure was performed in the same manner as in Example 1, except that the sol was replaced with the aqueous dispersion sol of silicon dioxide-stannic oxide composite oxide-modified zirconium oxide-stannic oxide composite oxide colloidal particles (C2) of Production Example 2. The resultant IPA dispersion sol was found to have a pH of 5.0, a total metal oxide ($ZrO_2$, $SnO_2$, and $SiO_2$) concentration of 20.3% by mass, a viscosity of 2.2 mPa·s, and an average particle diameter as determined by dynamic light scattering (DLS) (particle diameter by dynamic light scattering) of 27 nm. The metal oxide particles were found to contain $SnO_2$ in an amount of 11.8% by mole, $ZrO_2$ in an amount of 67.2% by mole, and $SiO_2$ in an amount of 20.9% by mole.

In this case, the residual methanol content (methanol in the composition corresponds to methanol in the dispersion medium) was 10 ppm, and the formaldehyde content before or after the light resistance test was less than 1 ppm.

Example 5

The procedure was performed in the same manner as in Example 1, except that the sol was replaced with the aqueous dispersion sol of silicon dioxide-stannic oxide composite oxide-modified stannic oxide colloidal particles (C3) of Production Example 3. The resultant IPA dispersion sol was found to have a pH of 5.0, a total metal oxide ($SnO_2$ and $SiO_2$) concentration of 20.5% by mass, a viscosity of 2.5 mPa·s, and an average particle diameter as determined by dynamic light scattering (DLS) (particle diameter by dynamic light scattering) of 26 nm. The metal oxide particles were found to contain $SnO_2$ in an amount of 80.7% by mole and $SiO_2$ in an amount of 19.3% by mole.

In this case, the residual methanol content (methanol in the composition corresponds to methanol in the dispersion medium) was 10 ppm, and the formaldehyde content before or after the light resistance test was less than 1 ppm.

Example 6

1.53 g of polyether-modified silane (trade name X-12-641, available from Shin-Etsu Chemical Co., Ltd., structure: $(CH_3O)_3SiC_3H_6(OC_2H_4)nOCH_3$) was added to 100 g of the aqueous dispersion sol of silicon dioxide-stannic oxide composite oxide-modified titanium oxide-stannic oxide-zirconium oxide composite oxide colloidal particles (C1) prepared in Production Example 1 with stirring. Subsequently, the sol was heated at 70° C. for five hours, to thereby modify the surfaces of the particles. The dispersion medium of the resultant aqueous dispersion sol was replaced with n-propanol by using a rotary evaporator, to thereby prepare an n-propanol dispersion sol of silicon dioxide-stannic oxide composite oxide-modified titanium oxide-stannic oxide-zirconium oxide composite oxide colloidal particles (C1). The amount of methanol remaining in the solvent was reduced at this stage. The n-propanol dispersion sol was found to have a pH of 6.9, a total metal oxide ($TiO_2$, $ZrO_2$, $SnO_2$, and $SiO_2$) concentration of 30.5% by mass, a viscosity of 4.6 mPa·s, and an average particle diameter as determined by dynamic light scattering (DLS) (particle diameter by dynamic light scattering) of 15 nm. The metal oxide particles were found to contain $SnO_2$ in an amount of 11.4% by mole, $TiO_2$ in an amount of 54.8% by mole, $ZrO_2$ in an amount of 10.1% by mole, and $SiO_2$ in an amount of 23.6% by mole.

In this case, the residual methanol content (methanol in the composition corresponds to methanol in the dispersion medium) was 5 ppm, and the formaldehyde content before or after the light resistance test was less than 1 ppm.

Example 7

Methanol was added to the n-propanol dispersion sol of silicon dioxide-stannic oxide composite oxide-modified titanium oxide-stannic oxide-zirconium oxide composite oxide colloidal particles (C1) prepared in Example 6 so that the residual methanol content (methanol in the composition corresponds to methanol in the dispersion medium) was 25 ppm on a trial basis. The metal oxide particles were found to contain $SnO_2$ in an amount of 11.4% by mole, $TiO_2$ in an amount of 54.8% by mole, $ZrO_2$ in an amount of 10.1% by mole, and $SiO_2$ in an amount of 23.6% by mole.

In the n-propanol dispersion sol, the formaldehyde content before or after the light resistance test was less than 1 ppm.

Example 8

Methanol was added to the n-propanol dispersion sol of silicon dioxide-stannic oxide composite oxide-modified titanium oxide-stannic oxide-zirconium oxide composite oxide colloidal particles (C1) prepared in Example 6 so that the residual methanol content (methanol in the composition corresponds to methanol in the dispersion medium) was 50 ppm on a trial basis. The metal oxide particles were found to contain $SnO_2$ in an amount of 11.4% by mole, $TiO_2$ in an amount of 54.8% by mole, $ZrO_2$ in an amount of 10.1% by mole, and $SiO_2$ in an amount of 23.6% by mole.

In the n-propanol dispersion sol, the formaldehyde content before or after the light resistance test was less than 1 ppm.

Example 9

Methanol was added to the n-propanol dispersion sol of silicon dioxide-stannic oxide composite oxide-modified titanium oxide-stannic oxide-zirconium oxide composite oxide colloidal particles (C1) prepared in Example 6 so that the residual methanol content (methanol in the composition corresponds to methanol in the dispersion medium) was 75 ppm on a trial basis. The metal oxide particles were found to contain $SnO_2$ in an amount of 11.4% by mole, $TiO_2$ in an amount of 54.8% by mole, $ZrO_2$ in an amount of 10.1% by mole, and $SiO_2$ in an amount of 23.6% by mole.

In the n-propanol dispersion sol, the formaldehyde content before or after the light resistance test was less than 1 ppm.

Example 10

Methanol was added to the n-propanol dispersion sol of silicon dioxide-stannic oxide composite oxide-modified titanium oxide-stannic oxide-zirconium oxide composite oxide colloidal particles (C1) prepared in Example 6 so that the residual methanol content (methanol in the composition corresponds to methanol in the dispersion medium) was 100 ppm on a trial basis. The metal oxide particles were found to contain $SnO_2$ in an amount of 11.4% by mole, $TiO_2$ in an amount of 54.8% by mole, $ZrO_2$ in an amount of 10.1% by mole, and $SiO_2$ in an amount of 23.6% by mole.

In the n-propanol dispersion sol, the formaldehyde content before or after the light resistance test was less than 1 ppm.

Example 11

69.3 g of IPA and 1.53 g of polyoxyethylene alkyl ether phosphate (RA-600, available from TOHO CHEMICAL INDUSTRY CO., LTD.) were added to 100 g of the aqueous dispersion sol of silicon dioxide-stannic oxide composite oxide-modified titanium oxide colloidal particles (C4) prepared in Production Example 4 with stirring, to thereby modify the surfaces of the particles. Subsequently, the dispersion medium of the resultant aqueous dispersion sol was replaced with IPA by using a rotary evaporator, to thereby prepare an IPA dispersion sol of silicon dioxide-stannic oxide composite oxide-modified titanium oxide colloidal particles (C4). The IPA dispersion sol was found to have a pH of 2.9, a total metal oxide ($TiO_2$, $SnO_2$, and $SiO_2$) concentration of 20.5% by mass, a viscosity of 9.1 mPa·s, and an average particle diameter as determined by dynamic light scattering (DLS) (particle diameter by dynamic light scattering) of 375 nm. The metal oxide particles were found to contain $SnO_2$ in an amount of 1.6% by mole, $TiO_2$ in an amount of 90.4% by mole, and $SiO_2$ in an amount of 8.0% by mole.

In this case, the residual methanol content (methanol in the composition corresponds to methanol in the dispersion medium) was 9 ppm, and the formaldehyde content before or after the light resistance test was less than 1 ppm.

Comparative Example 1

The dispersion medium of 100 g of the aqueous dispersion sol of silicon dioxide-stannic oxide composite oxide-modified titanium oxide-stannic oxide-zirconium oxide composite oxide colloidal particles (C1) prepared in Production Example 1 was replaced with methanol by using a rotary evaporator, to thereby prepare a methanol dispersion sol of silicon dioxide-stannic oxide composite oxide-modified titanium oxide-stannic oxide-zirconium oxide composite oxide colloidal particles (C1). The methanol dispersion sol was found to have a pH of 6.0, a total metal oxide ($TiO_2$, $ZrO_2$, $SnO_2$, and $SiO_2$) concentration of 30.0% by mass, a viscosity of 1.4 mPa·s, and an average particle diameter as determined by dynamic light scattering (DLS) (particle diameter by dynamic light scattering) of 18 nm. The metal oxide particles were found to contain $SnO_2$ in an amount of 11.4% by mole, $TiO_2$ in an amount of 54.8% by mole, $ZrO_2$ in an amount of 10.1% by mole, and $SiO_2$ in an amount of 23.6% by mole.

In this case, the residual methanol content (methanol in the composition corresponds to methanol in the dispersion medium) was 70%, the formaldehyde content before the light resistance test was less than 1 ppm, and the formaldehyde content after the light resistance test was 25 ppm.

Comparative Example 2

The procedure was performed in the same manner as in Comparative Example 1, except that the dispersion medium was replaced with ethanol. The metal oxide particles were found to contain $SnO_2$ in an amount of 11.4% by mole, $TiO_2$ in an amount of 54.8% by mole, $ZrO_2$ in an amount of 10.1% by mole, and $SiO_2$ in an amount of 23.6% by mole.

In this case, the residual ethanol content (ethanol in the composition corresponds to ethanol in the dispersion medium) was 70%, the acetaldehyde content before the light resistance test was 3 ppm, and the acetaldehyde content after the light resistance test was 25 ppm.

Comparative Example 3

The procedure was performed in the same manner as in Example 1, except that polyoxyethylene alkyl ether phosphate (RA-600, available from TOHO CHEMICAL INDUSTRY CO., LTD.) was not added. In this case, the sol gelated during solvent replacement and did not disperse in IPA.

Comparative Example 4

The procedure was performed in the same manner as in Example 2, except that polyoxyethylene alkyl ether phosphate (RA-600, available from TOHO CHEMICAL INDUSTRY CO., LTD.) was replaced with 1.22 g of 3-methacryloxypropyltrimethoxysilane (KBM-503, available from Shin-Etsu Chemical Co., Ltd.). The metal oxide particles were found to contain $SnO_2$ in an amount of 11.4% by mole, $TiO_2$ in an amount of 54.8% by mole, $ZrO_2$ in an amount of 10.1% by mole, and $SiO_2$ in an amount of 23.6% by mole.

In this case, the residual methanol content (methanol in the composition corresponds to methanol in the dispersion medium) was 400 ppm, the formaldehyde content before the light resistance test was less than 1 ppm, and the formaldehyde content after the light resistance test was 7 ppm.

Comparative Example 5

The procedure was performed in the same manner as in Comparative Example 1, except that the sol was replaced with the aqueous dispersion sol of silicon dioxide-stannic oxide composite oxide-modified zirconium oxide-stannic oxide composite oxide colloidal particles (C2) of Production Example 2. The metal oxide particles were found to contain $SnO_2$ in an amount of 11.8% by mole, $ZrO_2$ in an amount of 67.2% by mole, and $SiO_2$ in an amount of 20.9% by mole.

In this case, the residual methanol content (methanol in the composition corresponds to methanol in the dispersion medium) was 70%, the formaldehyde content before the light resistance test was less than 1 ppm, and the formaldehyde content after the light resistance test was 2 ppm.

Comparative Example 6

The procedure was performed in the same manner as in Comparative Example 1, except that the sol was replaced with the aqueous dispersion sol of silicon dioxide-stannic oxide composite oxide-modified stannic oxide colloidal particles (C3). The metal oxide particles were found to contain $SnO_2$ in an amount of 80.7% by mole and $SiO_2$ in an amount of 19.3% by mole.

In this case, the residual methanol content (methanol in the composition corresponds to methanol in the dispersion medium) was 70%, the formaldehyde content before the light resistance test was less than 1 ppm, and the formaldehyde content after the light resistance test was 12 ppm.

The sols prepared in Examples 1 to 10 exhibited an excellent stability; i.e., neither gelation nor phase separation occurred in the sols. Also, the sols of the Examples were found to have the excellent light resistance; i.e., the amount of formaldehyde, which was caused by the photocatalytic activity of the particles, was less than 1 ppm with or without ultraviolet irradiation.

In contrast, in Comparative Examples 1, 2, 5, and 6, the amount of methanol or ethanol in the composition was larger than that in the cases of the Examples, and formaldehyde or acetaldehyde was generated through the light resistance test. In Comparative Example 3, the sol exhibited a poor dispersibility in IPA due to no modification of the surfaces of the particles. In Comparative Example 4, the residual methanol content of the composition was higher than that in Example 10, and formaldehyde was generated through the light resistance test.

INDUSTRIAL APPLICABILITY

The present invention provides a composition containing photoactive metal oxide particles and capable of reducing generation of an aldehyde compound, etc. caused by photocatalytic action, and a production method for the composition. The present invention can reduce generation of a toxic volatile aldehyde compound.

The invention claimed is:

1. A composition comprising photoactive metal oxide particles (A), a dispersant (B), and an organic solvent (C) other than a volatile aldehyde compound, wherein the composition contains a $C_{1-2}$ alcohol in an amount of 200 ppm or less but greater than 0.

2. The composition according to claim 1, wherein the photoactive metal oxide particles (A) contain at least one photoactive metal oxide selected from the group consisting of titanium oxide, tin oxide, and zirconium oxide, and have an average particle diameter of 5 to 500 nm as determined by dynamic light scattering.

3. The composition according to claim 1, wherein the photoactive metal oxide particles (A) contain at least one photoactive metal oxide selected from the group consisting of titanium oxide, tin oxide, and zirconium oxide in an amount of 50% by mole or more in the entire metal oxides.

4. The composition according to claim 1, wherein the photoactive metal oxide particles (A) are metal oxide particles consisting of a photoactive metal oxide, metal oxide particles containing a photoactive metal oxide, or core-shell metal oxide particles;

the core-shell metal oxide particles are prepared by coating the surfaces of metal oxide particles serving as a core with a coating layer of metal oxide particles having a metal oxide component or metal oxide content different from the metal oxide component or metal oxide content of the core metal oxide; and the core metal oxide particles, the metal oxide particles of the coating layer, or both of these contain a photoactive metal oxide.

5. The composition according to claim 4, wherein the photoactive metal oxide particles (A) are core-shell metal oxide particles prepared by coating the surfaces of titanium oxide-containing metal oxide particles serving as a core with silica-containing metal oxide particles, and contain titanium oxide in an amount of 50% by mole or more in the entire metal oxides.

6. The composition according to claim 4, wherein the core metal oxide particles are particles of titanium oxide, zirconium oxide, tin oxide, a titanium oxide-tin oxide composite oxide, a zirconium oxide-tin oxide composite oxide, a titanium oxide-zirconium oxide composite oxide, or a titanium oxide-zirconium oxide-tin oxide composite oxide.

7. The composition according to claim 4, wherein the metal oxide particles of the coating layer are particles of at least one metal oxide selected from the group consisting of silicon dioxide, tin oxide, antimony oxide, tungsten oxide, aluminum oxide, and zirconium oxide, or particles of a composite metal oxide.

8. The composition according to claim 1, wherein the dispersant (B) is a silane compound, an organic acid or a salt thereof, a phosphate ester, or a surfactant.

9. The composition according to claim 8, wherein the silane compound is a silane coupling agent, and the silane coupling agent is at least one silane compound selected from the group consisting of silane compounds of the following Formulae $$R^1{}_a Si(R^2)_{4-a} \quad \text{Formula (1)}$$

Formula (2)

$$R^5{}_d Si(R^6)_{4-d} \quad \text{Formula (3)}$$

(in Formula (1), $R^1$ is each an alkyl group, a halogenated alkyl group, an alkenyl group, an aryl group, or an organic group containing a polyether group, an epoxy group, a (meth)acryloyl group, a mercapto group, an amino group, a ureido group, or a cyano group, and is bonded to a silicon atom via an Si—C bond; $R^2$ is each an alkoxy group, an acyloxy group, or a halogen group; and a is an integer of 1 to 3, and in Formulae (2) and (3), each of $R^3$ and $R^5$ is a $C_{1-3}$ alkyl group or a $C_{6-30}$ aryl group, and is bonded to a silicon atom via an Si—C bond; each of $R^4$ and $R^6$ is an alkoxy group, an acyloxy group, or a halogen group; Y is an alkylene group, an NH group, or an oxygen atom; b is an integer of 1 to 3; c is an integer of 0 or 1; and d is an integer of 1 to 3).

10. The composition according to claim 8, wherein the organic acid is at least one organic acid selected from the group consisting of a divalent aliphatic carboxylic acid, an aliphatic oxycarboxylic acid, an amino acid, and a chelating agent; the divalent aliphatic carboxylic acid is selected from the group consisting of oxalic acid, malonic acid, and succinic acid; the aliphatic oxycarboxylic acid is selected from the group consisting of glycolic acid, lactic acid, malic acid, tartaric acid, and citric acid; the amino acid is selected from the group consisting of glycine, alanine, valine, leucine, serine, and threonine; and the chelating agent is selected from the group consisting of ethylenediaminetetraacetic acid, L-aspartic acid-N,N-diacetic acid, and diethylenetriaminepentaacetic acid.

11. The composition according to claim 8, wherein the phosphate ester is at least one phosphate ester selected from the group consisting of phosphate esters of the following Formulae (4) to (6):

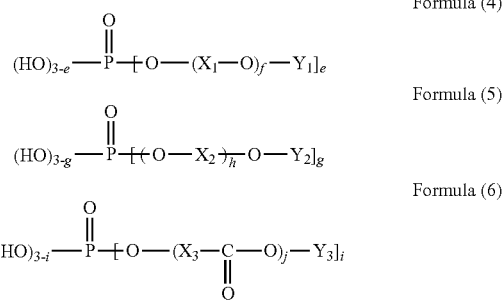

(in Formulae (4) to (6), $X_1$, $X_2$, and $X_3$ are each a $C_{2-20}$ alkylene group; f, h, and j are each an integer of 1 to 100; e, g, and i are each an integer of 1 to 3; and $Y_1$, $Y_2$, and $Y_3$ are each a hydrogen atom, a $C_{1-20}$ alkyl group, a $C_{2-20}$ alkenyl group, or a (meth)acrylic group).

12. The composition according to claim 8, wherein the phosphate ester is a polyoxyethylene alkyl ($C_{6-10}$) ether phosphate ester having a $C_{6-10}$ alkyl group.

13. The composition according to claim 8, wherein the surfactant is an anionic surfactant, a cationic surfactant, a nonionic surfactant, or an amphoteric surfactant.

14. The composition according to claim 1, wherein the organic solvent (C) is a $C_{3-10}$ alcohol possibly having an ether bond, an ester, a ketone, an amide, or a hydrocarbon.

15. The composition according to claim 1, wherein the composition further comprises a secondary amine or tertiary amine having a total carbon atom number of 5 to 35.

16. The composition according to claim 1, wherein, when 15 g of the composition is irradiated with ultraviolet rays having a wavelength of 365 nm at an intensity of 0.4 mW/cm² for four hours, the amount of a volatile aldehyde compound generated in the composition is 2 ppm or less.

17. The composition according to claim 1, wherein the composition contains a solid content in an amount of 0.1 to 70% by mass, and the entire solid content contains the photoactive metal oxide particles (A) in an amount of 80 to 99% by mass and the dispersant (B) in an amount of 1 to 20% by mass.

18. A varnish comprising the composition according to claim 1, and a thermosetting or photocurable resin.

19. The varnish according to claim 18, wherein the varnish is a hard coating agent or a filler.

20. A method for producing the composition according to claim 1, the method comprising the following steps (i) and (ii):

step (i): a step of mixing photoactive metal oxide particles (A), a dispersant (B), and an organic solvent (C) other than a volatile aldehyde compound; and step (ii): a step of removing a $C_{1-2}$ alcohol from the liquid of mixture prepared in the step (i) so that the amount of the $C_{1-2}$ alcohol is 200 ppm or less in the entire solvent.

* * * * *